US012738630B2

(12) United States Patent
(10) Patent No.: US 12,738,630 B2
(45) Date of Patent: Sep. 15, 2026
Wong et al.

(54) PAINTING ANTENNA AND ANTENNA-INTEGRATED ARTICLE

(71) Applicant: City University of Hong Kong, Kowloon (HK)

(72) Inventors: Hang Wong, Kowloon (HK); Ling Chi Ng, Kowloon (HK); Kwok Kan So, Kowloon (HK); King Tung Lo, Kowloon (HK)

(73) Assignee: City University of Hong Kong, Kowloon (HK)

(*) Notice: Subject to any disclaimer, the term of this patent is extended or adjusted under 35 U.S.C. 154(b) by 110 days.

(21) Appl. No.: 18/735,575

(22) Filed: Jun. 6, 2024

(65) Prior Publication Data

US 2025/0015478 A1 Jan. 9, 2025

Related U.S. Application Data

(60) Provisional application No. 63/511,713, filed on Jul. 3, 2023.

(51) Int. Cl.

*H01Q 1/22* (2006.01)
*H01Q 1/38* (2006.01)
*H01Q 1/48* (2006.01)

(52) U.S. Cl.

CPC ................. *H01Q 1/22* (2013.01); *H01Q 1/38* (2013.01); *H01Q 1/48* (2013.01)

(58) Field of Classification Search

CPC .. H01Q 1/22; H01Q 1/38; H01Q 1/48; H01Q 5/357; H01Q 9/0457

See application file for complete search history.

(56) References Cited

U.S. PATENT DOCUMENTS 8,536,588 B2 * 9/2013 Takahashi ............ C09K 11/584 343/702
10,936,834 B2 * 3/2021 Chang ................... H04L 9/3239
2005/0236603 A1 * 10/2005 Faris ....................... C09D 11/52 252/500
2015/0002346 A1 * 1/2015 Subbaraman ............ H01Q 1/38 343/720
2025/0348560 A1 * 11/2025 Blair ..................... G06F 21/106

FOREIGN PATENT DOCUMENTS

CN 109524768 A * 3/2019 ............... H01Q 1/36

OTHER PUBLICATIONS

S. U. Ahmed, Interaction and Interactivity: In the Context of Digital Interactive Art Installation. In: Kurosu, M. (eds) Human-Computer Interaction. Interaction in Context. HCI 2018. Lecture Notes in Computer Science, vol. 10902. Springer, Cham, 2018.

* cited by examiner

*Primary Examiner* — Seung H Lee

(74) *Attorney, Agent, or Firm* — Renner, Kenner, Greive, Bobak, Taylor & Weber

(57) ABSTRACT

An antenna attachable to an article includes: (i) a radiation element, (ii) a ground plane opposing the radiation element, and (iii) a dielectric member disposed between the radiation element and the ground plane, separating the radiation element from the ground plane, at least part of a surface of the radiation element being coated with an electrically conductive ink that enables decorative design, such that the antenna is configured to be camouflaged against a surface of the article.

20 Claims, 29 Drawing Sheets

(a) $f$ = 2.45 GHz (b) $f$ = 3 GHz (a) E-plane (b) H-plane

*f* = 2.45 GHz

E co-pol
E x-pol
H co-pol
H x-pol

*f* = 3 GHz f = 2.45 GHz

E co-pol
E x-pol
H co-pol
H x-pol f = 3 GHz

1600

*f* = 3 GHz

*f* = 2.45 GHz

PAINTING ANTENNA AND ANTENNA-INTEGRATED ARTICLE

TECHNICAL FIELD

The present invention refers to an antenna and an antenna-integrated article. In particular, the present invention refers to an antenna attachable to an artwork and an antenna-integrated artwork.

BACKGROUND OF THE INVENTION

Art technology brings to people's attention that artists are starting to utilize technology in the artwork as a new form of art, like creating digital art with animation and music to create an immersive artistic experience and using Artificial Reality (AR) or Virtual Reality (VR) technology as a creative expression. Many art galleries utilize technology to create new interactive, immersive artworks for providing a unique artistic experience to the gallery audience. These technology-based artworks have attracted much attention from artists, audiences, and researchers.

Technology-based artwork is considered as an integration of art and technology and has gained popularity in the recent years. The significant development of technology and urban life has led customers to seek more than practicality when considering the purchase of a technology product. The aesthetic contribution to the use case environment has become increasingly important in the last decade.

However, there is a lack of art-dependent technology products in the market. Although artistic production is being integrated with technology, technology still has not fully benefited from this kind of integration.

SUMMARY OF THE INVENTION

In a first aspect, there is provided an antenna attachable to an article, comprising: (i) a radiation element, (ii) a ground plane opposing the radiation element, and (iii) a dielectric member disposed between the radiation element and the ground plane, separating the radiation element from the ground plane, wherein at least part of a surface of the radiation element is coated with an electrically conductive ink that enables decorative design, such that the antenna is configured to be camouflaged against a surface of the article.

In an embodiment, the radiation element is coated with the electrically conductive ink by spray-painting.

In an embodiment, the radiation element is coated with the electrically conductive ink by brush-painting.

In an embodiment, the antenna further comprising a feed operably coupled with the radiation element and the ground plane.

In an embodiment, the feed is positioned within an area defined by an outer periphery of the ground plane in plan view.

In an embodiment, the feed is a L-shaped probe having a first portion extending substantially perpendicularly from the ground plane and a second portion extending substantially parallel to the radiation element, and wherein the second portion is spaced apart from the radiation element.

In an embodiment, the second portion of the L-shaped probe is spaced apart from the radiation element by 2 mm.

In an embodiment, the ground plane has an area substantially larger than that of the radiation element.

In an embodiment, the radiation element is positioned at a distance from an edge of the ground plane in plan view.

In an embodiment, the radiation element is rectangular in shape.

In an embodiment, the radiation element has a length of 55 mm and a width larger than or equal to 14 mm, and wherein the ground plane has a length and a width larger than or equal to 100 mm.

In an embodiment, the dielectric member is in form of a substrate or one or more supporting structures.

In an embodiment, the radiation element is spaced apart from the ground plane by 14 mm.

In an embodiment, the antenna is a patch antenna.

In an embodiment, the radiation element is made of polyethylene or polyurethane resin.

In an embodiment, the radiation element is made of wood or NinjaFlex.

In an embodiment, the article is a planar artwork selected from a group of a painting, a drawing, a picture, a photograph, or a combination thereof.

In a second aspect, there is provided an antenna-integrated article, comprising: (i) the antenna according to any one of claims 1 to 17, and (ii) an article comprising a surface for the antenna to be attached thereto.

In an embodiment, the radiation element of the antenna is attached on the surface of the article, with the ground plane positioned at a distance from the surface.

In an embodiment, the article further comprises a frame, wherein the frame is electrically insulative and is configured as the dielectric member to separate the radiation element from the ground plane.

In an embodiment, the surface of the article is configured with an aesthetic arrangement, such that upon the antenna being attached to the article, the antenna is camouflaged against the aesthetic arrangement on the surface of the article.

In an embodiment, the antenna-integrated article further comprising a data storage operably connected with the antenna; wherein the data storage stores information associated with the article that can be communicated via the antenna to an external device.

Optically, there is provided an antenna comprising an antenna element with an electrically conductive arrangement. The electrically conductive arrangement is made of one or more electrically conductive materials. At least part of the electrically conductive arrangement can provide a camouflage for the antenna when the antenna is integrated or combined with an article.

In some embodiments, one or more other parts of the antenna and/or one or more other parts of the article, may, in combination with the at least part of the electrically conductive arrangement, provide the camouflage for the antenna when the antenna is integrated or combined with the article.

The antenna may be operable as a transmit antenna and/or a receive antenna. The electrically conductive arrangement may have generally even thickness. The electrically conductive arrangement may include one or more electrically conductive layers. The electrically conductive arrangement may define a surface that may be smooth or rough. The electrically conductive arrangement may be generally planar.

In some embodiments, the electrically conductive arrangement is in the form of a patch. The patch may be generally polygonal (e.g., triangular, rectangular, squared, hexagonal, etc.) or rounded (e.g., circular, oval, elliptical, etc.) in plan view.

Optionally, the electrically conductive arrangement is spray-painted (e.g., on a base provided by the article or on a base provided by the antenna element).

Optionally, the electrically conductive arrangement is brush-painted (e.g., on a base provided by the article or on a base provided by the antenna element).

In some embodiments, the electrically conductive arrangement comprises an electrically conductive tape (e.g., attached to a base provided by the article or to a base provided by the antenna element). Optionally, the electrically conductive arrangement consists only of the electrically conductive tape.

Optionally, the antenna element further comprises a base on which the electrically conductive arrangement is applied. The base of the antenna element may be electrically non-conductive. The base of the antenna element may include a substrate with one or more material layers. The base of the antenna element may be generally planar. In some embodiments, the base of the antenna element provides a surface, and the electrically conductive arrangement is applied on only part of the surface (i.e., not on the entire surface). In some embodiments, the base of the antenna element provides a surface, and the electrically conductive arrangement is applied on the entire surface.

Optionally, the antenna further comprises: a ground plane, a feed operably coupled with the electrically conductive arrangement, and an electrical insulator arrangement supporting the antenna element relative to the ground plane such that the antenna element is spaced apart from the ground plane. The ground plane and the feed may together define a feed mechanism.

Optionally, the electrical insulator arrangement comprises a support frame.

Optionally, the electrical insulator arrangement is substantially transparent or translucent. For example, the electrical insulator arrangement may be made with or made of one or more substantially transparent materials and/or one or more translucent materials. For example, the electrical insulator arrangement may be made with or made of glass, crystal, etc. For example, the electrical insulator arrangement may be made of one or more dielectric materials. For example, the electrical insulator arrangement may be made of one or more non-dielectric materials.

Optionally, the electrical insulator arrangement comprises a first support structure and a second support structure. Optionally, the electrical insulator arrangement consists only of the first support structure and the second support structure. Optionally, the first support structure is disposed between the antenna element and the ground plane, and at, near, or along a first side of antenna element. Optionally, the second support structure is disposed between the antenna element and the ground plane, and at, near, or along a second side of antenna element. Optionally, the second side is generally opposite the first side.

Optionally, the antenna element is generally planar. Optionally, the ground plane is generally planar. Optionally, the antenna element is arranged generally parallel to the ground plane. In one example, the antenna element and the ground plane are spaced apart by about $0.1\lambda_0$ to about $0.2\lambda_0$ ($\lambda_0$ is free-space wavelength at a center operation frequency of the antenna).

Optionally, in plan view, the antenna element or the electrically conductive arrangement is arranged at or near a center of the ground plane.

Optionally, in plan view, the feed is within a footprint or area defined by an outer periphery of the ground plane.

Optionally, the feed does not directly contact the antenna element.

Optionally, the feed comprises a generally L-shaped feed probe electrically coupled with the electrically conductive arrangement. Optionally, the generally L-shaped feed probe comprises a first probe portion and a second probe portion. Optionally, the first probe portion extends generally perpendicular to the antenna element and the second probe portion extends generally parallel to the antenna element. The first and second probe portions may be spaced apart from the antenna element (i.e., the first and second probe portions do not directly contact the antenna element). Optionally, at least half of the second probe portion is disposed between the electrically conductive arrangement and the ground plane.

Optionally, in plan view, the second probe portion extends generally along an axis generally parallel to a midline of the antenna element or the electrically conductive arrangement.

Optionally, the antenna element is in the form of a patch hence is a patch element. The patch element may be generally polygonal (e.g., triangular, rectangular, squared, hexagonal, etc.) or rounded (e.g., circular, oval, elliptical, etc.) in plan view.

Optionally, the antenna is a patch antenna.

Optionally, at least part of the electrically conductive arrangement or at least part of the antenna element provides a decorative arrangement with one or more colors and/or one or more patterns. The one or more colors and/or one or more patterns may form an image or part of an image.

Optionally, the antenna comprises multiple ones of the antenna element and the antenna may be an antenna array. The multiple ones of the antenna element may be applied on the same base (e.g., provided by the article) or on different bases (e.g., provided by the article or provided by different antenna elements).

Optionally, the article comprises a decorative object such as artwork. For example, the artwork may be or include a painting (e.g., created using paint such as oil paint), a drawing, a picture, a photograph, etc.

In some embodiments, the article may include a base and one or more electrically non-conductive materials applied on the base. The one or more electrically non-conductive materials applied on the base, and optionally the base, may define one or more colors or one or more patterns which may form an image or part of an image.

Optionally, the base of the article is the base on which the electrically conductive arrangement is applied. The base of the article is electrically non-conductive. The base of the article may include a substrate with one or more material layers. The base of the article may be generally planar. In some embodiments, the base of the article provides a surface, and the electrically conductive arrangement is applied on only part of the surface (i.e., not on the entire surface). In one example, the article is a painting, the base of the article comprises a substrate (e.g., canvas), and the one or more electrically non-conductive materials applied on the base comprise oil paint.

Optionally, the antenna may be an antenna of a near field communication (NFC) tag, an antenna of a RFID device (e.g., reader), etc.

There is also provided an antenna-integrated article comprising: an article, and the antenna of the first aspect integrated or combined with the article. At least part of the electrically conductive arrangement provides a camouflage for the antenna integrated or combined with the article.

In some embodiments, one or more other parts of the antenna and/or one or more other parts of the article, may, in combination with the at least part of the electrically conductive arrangement, provide the camouflage for the antenna integrated or combined with the article.

Optionally, the article comprises a decorative object such as artwork. For example, the artwork may be or include a painting (e.g., created using paint such as oil paint), a drawing, a picture, a photograph, etc.

In some embodiments, the article may include a base and one or more electrically non-conductive materials applied on the base. The one or more electrically non-conductive materials applied on the base, and optionally the base, may define one or more colors or one or more patterns which may form an image or part of an image. In some embodiments, the one or more electrically non-conductive materials applied on the base may cover part of the electrically conductive arrangement of the antenna.

Optionally, the base of the article is the base on which the electrically conductive arrangement is applied. The base of the article is electrically non-conductive. The base of the article may include one or more material layers. The base of the article may be generally planar. In some embodiments, the base of the article provides a surface, and the electrically conductive arrangement is applied on only part of the surface (i.e., not on the entire surface). In one example, the article is a painting, the base of the article comprises a substrate (e.g., canvas), and the one or more electrically non-conductive materials applied on the base comprise oil paint.

Optionally, (i) at least part of the electrically conductive arrangement or at least part of the antenna element and (ii) at least a portion of the article together define a decorative arrangement (e.g., one or more colors and/or one or more patterns that form an image or part of an image) such that at least part of the electrically conductive arrangement or at least part of the antenna element is substantially concealed in the decorative arrangement (e.g., one or more colors and/or one or more that form an image or part of an image).

Optionally, the article defines an opening and the antenna is disposed or supported such that the electrically conductive arrangement or the antenna element of the antenna is generally aligned with the opening. In this way, when the antenna-integrated article is viewed from a side (e.g., front), at least part of the electrically conductive arrangement or at least part of the antenna element of the antenna remains visible and other parts of the antenna are substantially hidden from view.

Optionally, the electrically conductive arrangement includes a first surface, the article includes a second surface with the opening, and the first surface and the second surface form a generally continuous boundary surface. In this way, the antenna element may appear to blend in to the article relatively naturally. In some embodiments, the first surface is generally planar, the second surface is generally planar, and the first surface and the second surface are generally parallel. For example, the first surface and the second surface may be generally co-planar.

Optionally, the antenna-integrated article further comprises a data storage operably connected with the antenna, and the data storage stores information associated with the article that can be communicated via the antenna to an external device. In one example, the article is an artwork and the information associated with the article comprises description of the artwork, description of the artist(s) associated with the artwork, location of the artwork, etc. In some examples, the presence of an external device in proximity of the antenna-integrated article is detected by a sensor, and the information associated with the article is communicated via the antenna to the external device in response to detection of the external device by the sensor.

Optionally, the antenna may be an antenna of a near field communication (NFC) tag, an antenna of a RFID device (e.g., reader), etc.

There is provided a method for modifying or making an antenna. The antenna is for integrating or combining with an article. The method comprises: applying an electrically conductive arrangement on a base of an antenna element such that at least part of the electrically conductive arrangement can provide a camouflage for the antenna when the antenna is integrated or combined with the article. The electrically conductive arrangement is formed by one or more electrically conductive materials. The base may be provided by the antenna element of the antenna or by the article.

In some embodiments, one or more other parts of the antenna and/or one or more other parts of the article may, in combination with the at least part of the electrically conductive arrangement, provide the camouflage for the antenna when the antenna is integrated or combined with the article.

Optionally, the article comprises a decorative object such as artwork. For example, the artwork may be or include a painting (e.g., created using paint such as oil paint), a drawing, a picture, a photograph, etc.

Optionally, the applying comprises spray-painting the electrically conductive arrangement on the base.

Optionally, the applying comprises brush-painting the electrically conductive arrangement on the base.

Optionally, the electrically conductive arrangement comprises electrically conductive tape and the applying comprises attaching the electrically conductive tape to the base.

Optionally, the electrically conductive arrangement is in the form of a patch.

Optionally, the antenna element is in the form of a patch.

Optionally, the antenna is a patch antenna.

Optionally, the method further comprises: providing a ground plane, arranging a feed to operably couple with the electrically conductive arrangement, and arranging an electrical insulator arrangement to support the antenna element relative to the ground plane such that the antenna element is spaced apart from the ground plane. In some examples, the application of the electrically conductive arrangement on an antenna element can be performed before or after providing the ground plane. In some examples, the application of the electrically conductive arrangement on an antenna element can be performed before or after arranging the feed to operably couple with the electrically conductive arrangement. In some examples, the application of the electrically conductive arrangement on an antenna element can be performed before or after arranging the electrical insulator arrangement to support the antenna element.

Optionally, the method further comprises: applying an electrically non-conductive arrangement on at least part of the electrically conductive arrangement of the antenna element such that at least part of the electrically non-conductive arrangement and at least part of the electrically conductive arrangement can provide the camouflage for the antenna when the antenna is integrated or combined with an article.

The method of the third aspect may be used to make the antenna of the first aspect and/or to facilitate making of the antenna-integrated article of the second aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that “generally”, “about”, “substantially”, or the like, are used, depending on context, to account for manufacture tolerance, degradation, trend, tendency, imperfect practical condition(s), etc. When a value is modified by a term of degree, such as “about”, such expression may include the stated value±20%, ±10%, ±5%, ±2%, or ±1%.

Unless otherwise specified, the term “connected” is intended to encompass both direct and indirect connection; the term “coupled” is intended to encompass both direct and indirect coupling; the term “mounted” is intended to encompass both direct and indirect mounting.

Embodiments of the present invention provide an integration between antenna technologies and art by applying an electrically conductive ink onto a radiation element of the antenna. This allows the antenna to blend into the decorative arrangement on the surface of an art piece. Such embodiments are advantageous over the antennas of the prior art, as traditional antennas often lack an aesthetically pleasing appearance and are therefore typically positioned in locations that are concealed by other objects in order to avoid any adverse impact on the overall appearance of the environment. However, placing the antennas in a concealed location, for instance within a closed cabinet, may result in a reduction in signal strength and a deterioration in antenna performance. Therefore, embodiments of the present invention provide a solution that allows for the incorporation of decorative design on the antenna, thus enabling its placement in an open area during normal use while maintaining the performance level of the antenna at the same level as that of a traditional antenna.

BRIEF DESCRIPTION OF THE FIGURES

In order that a more precise understanding of the above-recited invention can be obtained, a more particular description of the invention briefly described above will be rendered by reference to specific embodiments thereof that are illustrated in the appended drawings. The drawings presented herein may not be drawn in scale and any reference to dimensions in the drawings or the following description is specific to the embodiments disclosed.

DETAILED DESCRIPTIONS OF THE EMBODIMENTS

According to embodiments of the present invention, the antenna could be applied in several situations. In a household case, antennas of domestic Wi-Fi routers usually do not have visually attractive appearances. A typical Wi-Fi antenna might not be visually appealing. Domestic users hence tend to place their Wi-Fi routers in a position invisible during normal use to avoid affecting the aesthetic design of the environment. This might lead to poor performance in the Wi-Fi signal. An aesthetic pleasing antenna for a Wi-Fi router would be preferable for those domestic users who want to get the best performance from the router while having an artistic decoration in their living environment. Using an antenna with an artistic design such as an embodiment of the present invention would not affect the aesthetic environment. Users may be more likely to place the antenna in a visible location, which would help to optimize the Wi-Fi performance as there would be fewer obstacles blocking the Wi-Fi signal.

Further, an antenna could emerge in the art gallery as an application of the Internet of Things (IoT). The antenna could be used as a sensor in the gallery, connecting physical objects, the painting, people, visitors and artists, and servers that store information. IoT applications cover various areas, and an intelligent art gallery environment with IoT applications could be achieved to further enhance the visitor experience and quality of life. The antenna can serve as a seamless wireless communication device in the gallery. The Radio Frequency Identification (RFID) or Near Field Communication (NFC) function could be used in the painting antenna to access the gallery, or to direct visitors' devices to an introduction page of the gallery and the artist.

The feasibility and possibility of applying an electrically conductive ink to the antenna is being explored by the present inventors. Antennas that act as RFID readers could be seamlessly installed and hidden within the art gallery, providing a more secure way into the restricted area of the gallery and a safe environment for the storage of artworks.

To develop an embodiment of the antenna according to the present invention, a patch antenna design is preferred, although other types of antennas are also applicable. A patch antenna can be flexible in its geometric shapes and dimensions, which could benefit the integration of the antenna and the painting. The flexibility of the patch's geometric shapes allows it to be functional in shapes such as triangles, rings, circles and rectangles. This provides more scope for the aesthetic design of the patch antenna compared to other antenna designs such as dipole or slot antennas, which are typically manufactured in a rectangular shape. The patch antenna design is also flat and planar, which could be the second advantage in blending the antenna with the painting to create a seamless antenna on the canvas.

Figure 1:
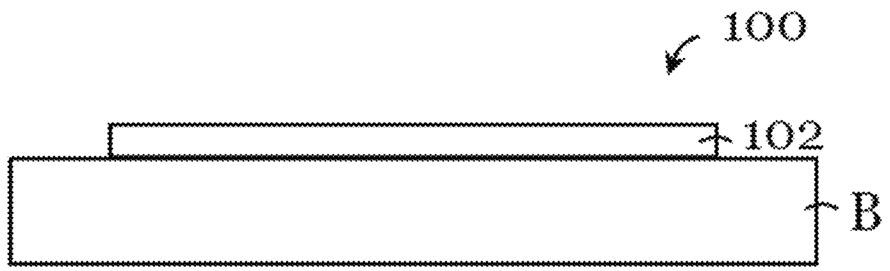
FIG. 1 is a schematic diagram of an antenna element of an antenna in an embodiment of the invention.

Referring now to FIG. 1, which shows, schematically, an antenna element 100 for an antenna in some embodiments of the invention. For simplicity, other parts of the antenna are not illustrated in FIG. 1. The antenna may be operable as a transmit antenna and/or a receive antenna. In some embodiments, the antenna is a patch antenna. In some embodiments, the antenna may include multiple antenna elements, one or more of which is the antenna element 100, and the antenna may be an antenna array. The antenna is arranged for integrating or combining with an article (to form an antenna-integrated article).

The antenna element 100 includes a radiation element 102 applied on a base B. The base B includes a ground plane, and a dielectric member supporting the radiation element 102 from the ground plane, which separates the ground plane from the radiation element. In some embodiments, the base B is partly provided by the article that the antenna is arranged for integrating or combining with.

In some embodiments, the antenna element 100 is in the form of a patch (or is a patch element). The patch element may have a generally polygonal (e.g., triangular, rectangular, squared, hexagonal, etc.) or rounded (e.g., circular, oval, elliptical, etc.) cross section.

The radiation element 102 may be applied on at least part of a surface of the base B. The radiation element 102 may have generally even thickness (e.g., generally flat). The radiation element 102 may define a surface that may be smooth or rough. The radiation element 102 may be generally planar.

The radiation element 102 may be in the form of a patch. The patch may be generally polygonal (e.g., triangular, rectangular, squared, hexagonal, etc.) or rounded (e.g., circular, oval, elliptical, etc.) in plan view.

In some embodiments, the radiation element 102 may be brush-painted or spray-painted with an electrically conductive ink.

In some embodiments, the base B of the antenna element 100 may include a substrate with one or more material layers. The base B of the antenna element 100 may be generally planar. The base B of the antenna element 100 may provide a surface, and the radiation element 102 is applied on only part of the surface (i.e., not on the entire surface) or is applied on the entire surface.

In some embodiments, at least part of the radiation element 102 or at least part of the antenna element 100 provides a decorative arrangement with one or more colors and/or one or more patterns. The one or more colors and/or one or more patterns may define an image or part of an image.

In some embodiments, the antenna may further include a feed operably coupled with the radiation element 102. In some embodiments, the antenna includes a support frame as the dielectric member, disposed between the radiation element 102 and the ground layer. In some embodiments, the dielectric member is substantially transparent or translucent. In some embodiments, the dielectric member is one or more support structures such as pillars. In some embodiments, the antenna element 100 is generally planar, and the radiation element 120 may be arranged generally parallel to the ground plane. In one example, the radiation element 120 and the ground plane are spaced apart by about $0.1\lambda_0$ to about $0.2\lambda_0$ ($\lambda_0$ is free-space wavelength at a center operation frequency of the antenna). In some embodiments, the feed does not directly contact the radiation element 120. In some embodiments, the feed includes a generally L-shaped feed probe electrically coupled with (but does not directly contact) the ground plane.

In some embodiments, the antenna may be an antenna of a near field communication (NFC) tag, an antenna of a RFID device (e.g., reader), etc.

The antenna that includes the antenna element 100 may belong to an antenna-integrated article, which includes an article and the antenna including the antenna element 100 integrated or combined with the article.

At least part of the radiation element 102 is configured to provide a camouflage for the antenna when the antenna is integrated or combined with the article. In some embodiments, one or more other parts of the antenna and/or one or more other parts of the article, may, in combination with the at least part of the radiation element 102, provide the camouflage for the antenna when the antenna is integrated or combined with the article.

In some embodiments, the article may be a decorative object such as an artwork. The artwork may be, e.g., a painting (e.g., created using paint such as oil paint), a drawing, a picture, a photograph, etc.

In some embodiments, the article may include the base B. The base B of the article may include a substrate with one or more material layers. The base B of the article may be generally planar. In some embodiments, the base B of the article may provide a surface, and the radiation element 102 is applied on only part of the surface (i.e., not on the entire surface). In some embodiments, the article also includes one or more electrically non-conductive materials applied on the base B of the article. In some embodiments, the one or more electrically non-conductive materials applied on the base B of the article may cover part of the radiation element 102. The one or more electrically non-conductive materials applied on the base B of the article, and optionally the base B of the article, may define one or more colors or one or more patterns which may form an image or part of an image. In one example, the article is a painting, the base B of the article comprises a substrate (e.g., canvas), and the one or more electrically non-conductive materials applied on the base B comprise oil paint.

In some embodiments, at least part of the radiation element 102 or at least part of the antenna element 100 of the antenna and at least a portion of the article may together define a decorative arrangement (e.g., one or more colors and/or one or more patterns that form an image or part of an image) such that the at least part of the radiation element 102 or the at least part of the antenna element 100 of the antenna is substantially concealed in the decorative arrangement (e.g., one or more colors and/or one or more patterns that form an image or part of an image).

In some embodiments, the article defines an opening and the antenna is disposed or supported such that the radiation element 102 or the antenna element 100 of the antenna is generally aligned with the opening. In this way, when the antenna-integrated article is viewed from one side (e.g., front), at least part of the radiation element 102 or at least part of the antenna element 100 of the antenna remains visible while other parts of the antenna are substantially hidden from view, e.g., by the article.

In some embodiments, the radiation element 102 includes a first surface, the article includes a second surface with the opening, and the first surface and the second surface form a generally continuous boundary surface. In some embodiments, the first surface is generally planar, the second surface is generally planar, and the first surface and the second surface are generally parallel (e.g., generally co-planar).

In some embodiments, the antenna-integrated article further includes a data storage operably connected with the antenna and storing information associated with the article. The information associated with the article can be communicated via the antenna to an external device. In one example, the article is an artwork and the information associated with the article includes description of the artwork, description of the artist(s) associated with the artwork, location of the artwork, etc.

Figure 2:
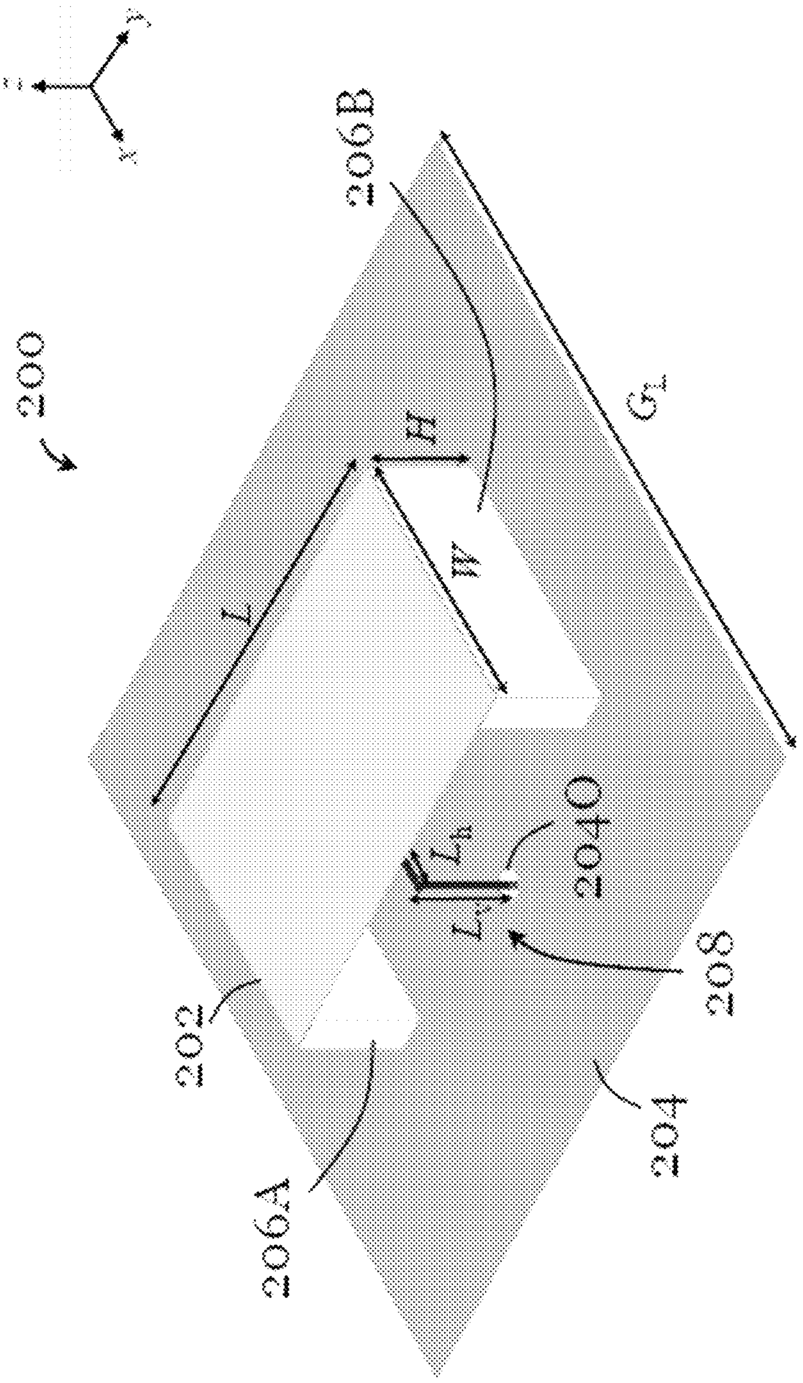
FIG. 2 is a schematic diagram of an antenna in another embodiment of the invention.

FIG. 2 shows an antenna 200 in one embodiment. In this embodiment, the antenna 200 is operable to transmit and receive electromagnetic signals.

The antenna 200 includes a radiation element 202 with a ground layer 204, wherein the radiation element 202 is separated from the ground layer by two support structures 206A, 206B. In this embodiment, the two support structures 206A, 206B are dielectric members which are made of dielectric materials such as plastic foam. In this embodiment, the radiation element 202 is a generally rectangular patch element with length L and width W. In this embodiment, the radiation element 202 is generally planar. At least part of the radiation element 202 is applied with an electrically conductive ink (e.g., brush-painted, spray-painted, etc.). In some examples, the radiation element 202 is referred to as a painted patch element.

In this embodiment, at least part of the radiation element 202 is arranged to provide a decorative arrangement with one or more colors and/or one or more patterns (which may form an image or part of an image), for blending in an object such as a decorative object to facilitate concealment of the antenna 200 in the object.

In this embodiment, the ground plane 204 is generally squared with length GL. In this embodiment, the ground plane 204 is generally planar and generally parallel to the antenna element 202. In one example, the antenna element 202 and the ground plane 204 may be spaced apart by about $0.1\lambda_0$ to about $0.2\lambda_0$ ($\lambda_0$ is free-space wavelength at a center operation frequency of the antenna 200). In this embodiment, in plan view, the antenna element 202 is arranged at or near a center of the ground plane 204. In this embodiment, the ground plane 204 is made of aluminium. In this embodiment, the ground plane 204 includes an opening 2040 through which a feed probe of the feed (further described below) can extend without contacting the ground plane 204.

In this embodiment, the dielectric support structures 206A, 206B support the radiation element 202 relative to the ground plane 204 such that the two are spaced apart. In some examples, the dielectric support structures 206A, 206B may be substantially transparent or translucent. In this embodiment, the dielectric support structures 206A, 206B are pillars, one disposed between the radiation element 202 and the ground plane 204 at and along one side (a short side) of radiation element 202 and another disposed between the radiation element 202 and the ground plane 204 at and along an opposite side (an opposite short side) of radiation element 202. The dielectric support structures 206A, 206B have generally the same size, with generally the same height H extending generally perpendicular to the radiation element 202 and the ground plane 204.

The antenna 200 also includes a feed 208 operably coupled with the radiation element 202 and the ground plane 204. In this embodiment, the feed 208 does not directly contact the radiation element 202. In this embodiment, the feed 208 is a generally L-shaped feed probe electrically coupled with the radiation element 202. As shown in FIG. 2, the generally L-shaped feed probe has one generally vertical probe portion (length Lv) extending through a hole in the ground plane 204 and generally perpendicular to the radiation element 202, and a generally horizontal probe portion (length Ln) continuous with the generally vertical probe portion and extending generally parallel to the radiation element 202. In this example, the generally horizontal probe portion is spaced apart from the radiation element 202 along the z-axis. In this example, in plan view, the generally vertical probe portion is placed at 20.5 mm along to x-axis from the center of ground plane 204. In this example, in plan view, the generally horizontal probe portion extends generally along an axis generally parallel to a midline of the radiation element 202. In this example, in plan view, the feed 208 is generally located within a footprint or area defined by an outer periphery of the ground plane 204. In this example, the generally L-shaped feed probe is made from (by bending) a generally cylindrical copper wire with radius 0.5 mm.

In this embodiment, the antenna 200 has a relatively simple structure and good electrical characteristics (e.g., relatively wide bandwidth, relatively stable gain, relatively high radiation efficiency, and relatively desirable radiation pattern across the operation frequency band).

In one example, the antenna 200 can be integrated with an object such as a picture/painting such that the radiation element 202 with the electrically conductive arrangement can form part of the picture/painting, and that the feed 208, the ground plane 204, and the electrical insulator arrangement can be hidden behind the picture/painting.

Table I lists the values of parameters of the antenna 200 in this example ($\lambda_0$ is the free-space wavelength at the center operation frequency of the antenna 200). In other embodiments, the parameter values may be different from those illustrated in Table I.

TABLE I

Example values of parameters of the antenna 200

| Parameters | L | W | H | $L_v$ | $L_h$ | $G_L$ |
|---|---|---|---|---|---|---|
| Values | 57 | 37 | 15 | 13.5 | 9 | 100 |
| (mm) | $0.532\lambda_0$ | $0.345\lambda_0$ | $0.14\lambda_0$ | $0.126\lambda_0$ | $0.084\lambda_0$ | $0.933\lambda_0$ |

Figure 3:
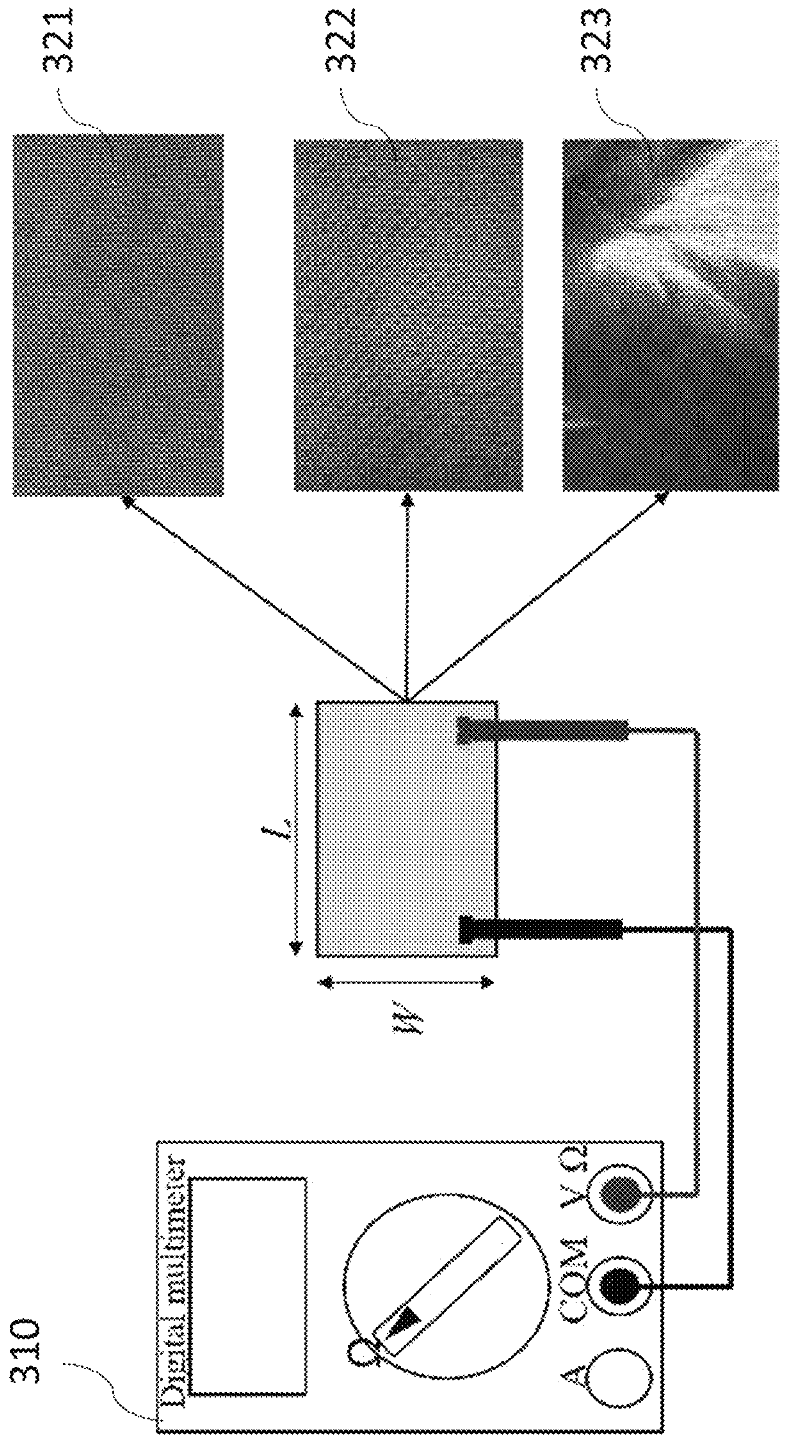
FIG. 3 shows an experimental setup for testing resistivity of a conductive paint patch, a copper tape patch and a conductive spray patch.

Experiments are performed to investigate the relationship between electrical resistance and width of the rectangular patch antenna element with the electrically conductive arrangement. In this example, two rectangular patch antenna elements are tested: a rectangular patch antenna element with an electrically conductive paint applied to a radiation element by spray-painting 323, and a rectangular patch antenna element with an electrically conductive paint applied to a radiation element by brush-painting 321; with a control antenna using a copper tape antenna element 322. The experimental setup thereof is illustrated by FIG. 3. In the experiments, the electrical resistance of the rectangular patch antenna elements is measured using a digital multimeter 310. The length of each of the rectangular patch antenna element is 51 mm and the distance of the testing point is 47 mm along the length of the rectangular patch antenna element.

Figure 4A:
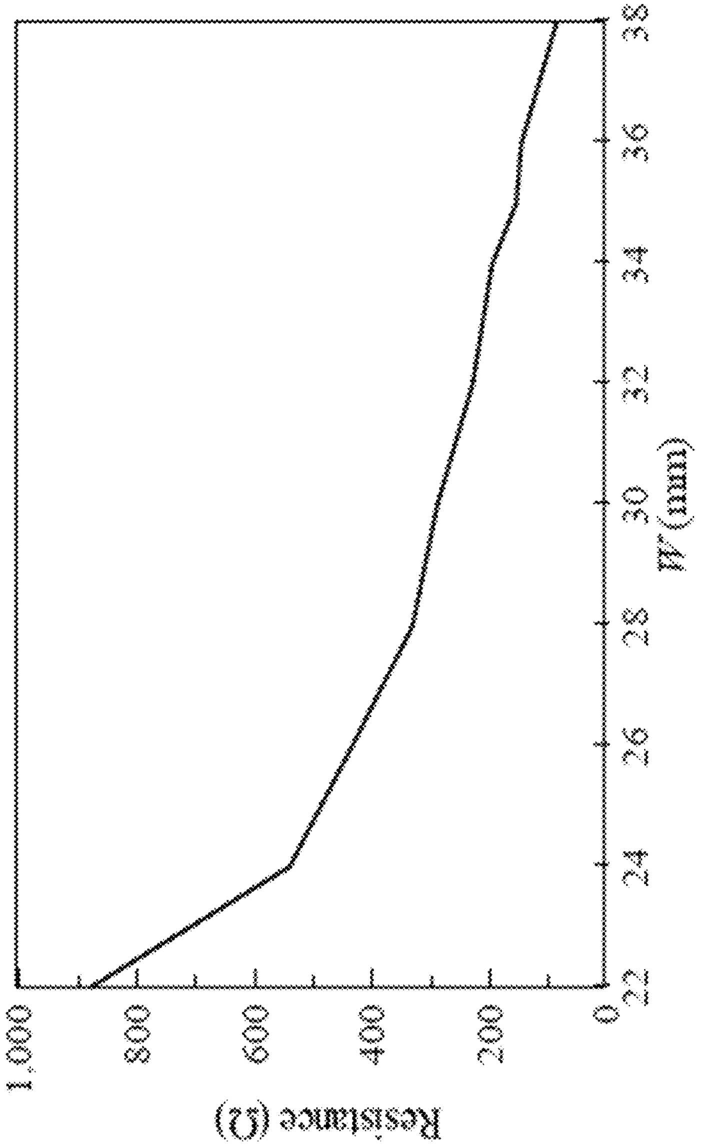
FIG. 4A is a graph showing a relationship between electrical resistance (Ω) and width (mm) of a radiation element of the antenna of FIG. 2, that is coated with an electrically conductive ink by brush painting.
Figure 4B:
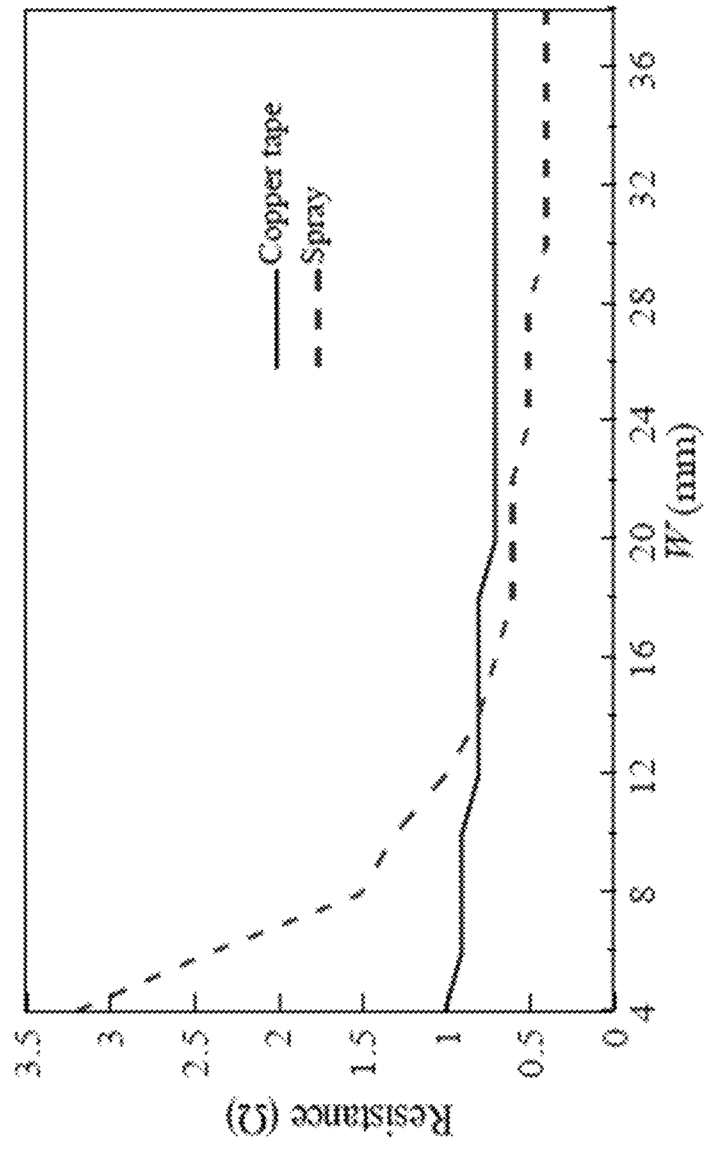
FIG. 4B is a graph showing a relationship between electrical resistance (Ω) and width (mm) of a radiation element of the antenna of FIG. 2, that is coated with an electrically conductive ink by spray painting, as well as a relationship between electrical resistance (Ω) and width (mm) of a copper tape of a control antenna.

FIG. 4A shows the results for the rectangular patch antenna element that includes an electrically conductive paint applied on a base by brush-painting. From FIG. 4A, it can be seen that a relatively high electrical resistance (>100 (Ω) is obtained across the tested width of the antenna element hence the electrical conductivity is relatively low. FIG. 4B shows the results for the rectangular patch antenna element that includes an electrically conductive paint applied on a base by spray-painting and for the control antenna element that includes a copper tape as the radiation element. From FIG. 4B, it can be seen that the electrical resistance of the two rectangular patch antenna elements are similar (e.g., both less than 1Ω when the tested width of the antenna element is larger than 15 mm).

Figure 5A:
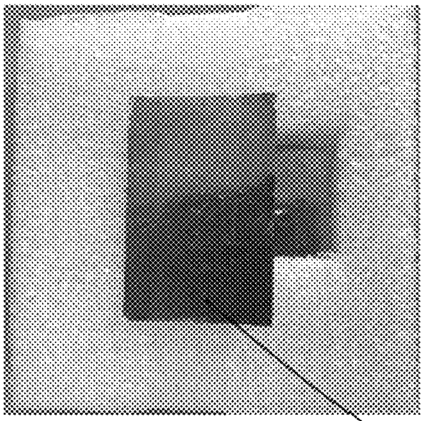
FIG. 5A is a photograph showing a control antenna including a copper tape as a radiation element.
Figure 5B:
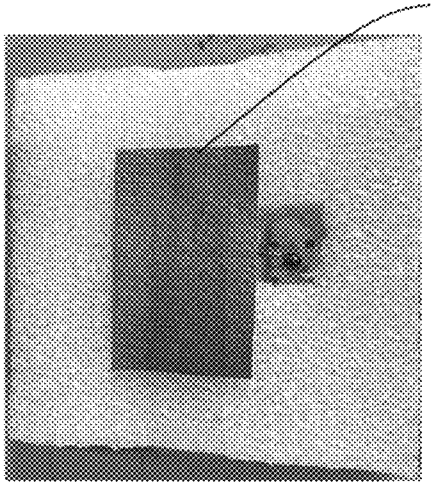
FIG. 5B is a photograph showing an antenna according to an embodiment of the present invention, wherein the radiation element is coated with an electrically conductive ink by brush painting.
Figure 5C:
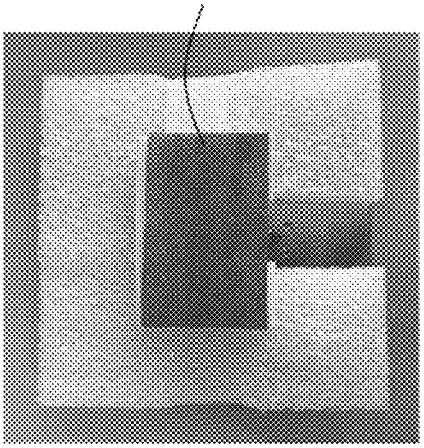
FIG. 5C is a photograph showing an antenna according to another embodiment of the present invention, wherein the radiation element is coated with an electrically conductive ink by spray painting.

FIG. 5A shows a control antenna element 510 with a copper tape as the radiation element. FIG. 5B shows an antenna including an antenna element 520 with an electrically conductive paint (in this example, copper paint) applied to the radiation element by brush-painting in one example. FIG. 5C shows an antenna including an antenna element 530 with an electrically conductive paint (in this example, copper spray) applied to the radiation element by spray-painting in one example. These antennas in FIGS. 5A to 5C are constructed based on the design of the antenna 200 in FIG. 2. In FIGS. 5A to 5C, the L-shaped feed probe and ground plane of each of the antennas are also shown.

L-probe antenna designs are preferred as this allows the feed probe to be hidden from view during normal use. This design does not require a probe at the edge of the antenna surface. The L-probe antenna design also provides a broader impedance bandwidth than other direct feed designs.

According to an embodiment of the present invention, electrically conductive ink is utilised. In the research conducted by the present inventors, electrically conductive ink with the design of a microstrip patch antenna is fabricated for testing.

In an embodiment of the present invention, the electrically conductive ink is applied by brushing and spraying. The brush-painted method is adopted by brushing an electrically conductive ink on a wooden substrate for the radio frequency identification tag antenna and on a 3D-printed NinjaFlex for the wearable antenna. The spray-painted method is applied by spraying the conductive ink onto a 3D-printed polyethylene substrate and polyurethane resin for the radar cross section measurement. On the basis of the research, it is shown that electrically conductive ink or paint is feasible in the fabrication of an antenna.

The difference between the two types of electrically conductive inks has been investigated. The two types of inks include conductive paint and conductive spray.

According to an embodiment of the present invention, the antenna consists of a patch, with a length of L=57 mm and a width of W=37 mm, supported by foam with a height of H=14 mm, L-shaped feeding probe and a ground plane to operate at a lower resonant frequency of 2.45 GHz and a higher resonant frequency of 3 GHZ. The L and W of the patch were calculated with the following equations:

Where $$L = \frac{c}{zf_r\sqrt{\varepsilon_{re}}} \tag{1}$$

$$W = \frac{c}{2f_r\sqrt{\frac{\varepsilon_r + 1}{2}}} \tag{2}$$

$$\varepsilon_{re} = \frac{\varepsilon_r + 1}{2} + \frac{\varepsilon_r - 1}{2\sqrt{1 + 12\left(\frac{H}{W}\right)}} \tag{3}$$

in which $f_r$ is the preferred resonant frequency, $\varepsilon_r$ is the relative dielectric constant of the substrate, and c is the speed of light. Three prototypes were fabricated with a patch made of conductive paint, conductive spray, and copper tape. The detailed dimensions of the prototypes were obtained after finetuning and are shown in Table I.

Figure 6A:
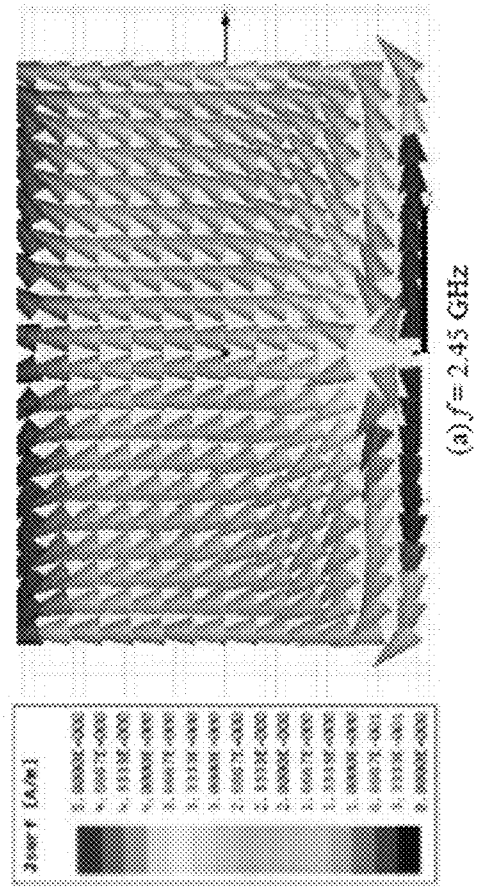
FIG. 6A is a graph showing simulated electric field distributions of an antenna according to an embodiment of the present invention, when operating at a resonant frequency of 2.45 GHZ.
Figure 6B:
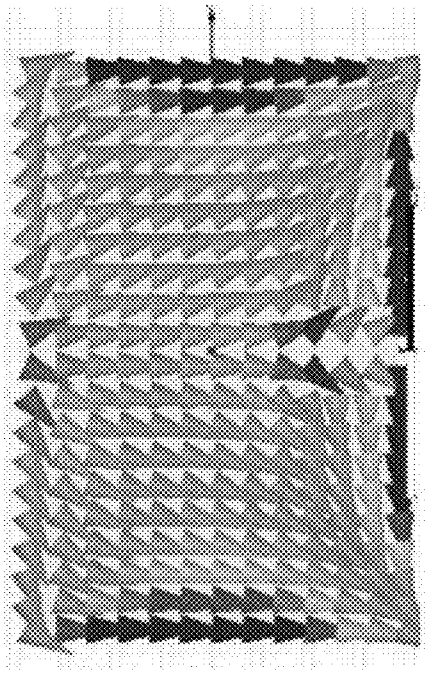
FIG. 6B is a graph showing simulated electric field distributions of an antenna according to an embodiment the present invention, when operating at a resonant frequency of 3 GHZ.
Figure 7A:
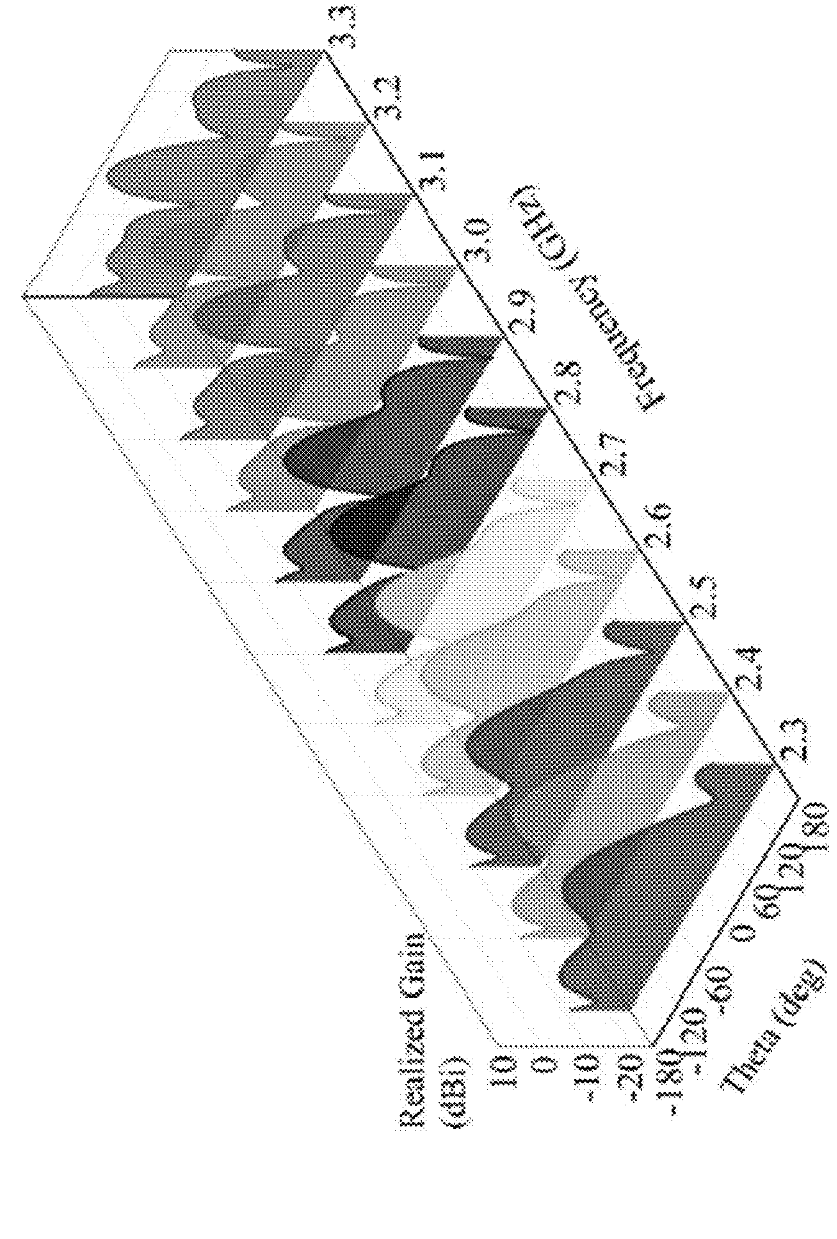
FIG. 7A is a graph showing simulated co-polarised fields of the E-plane of an antenna according to an embodiment of the present invention.
Figure 7B:
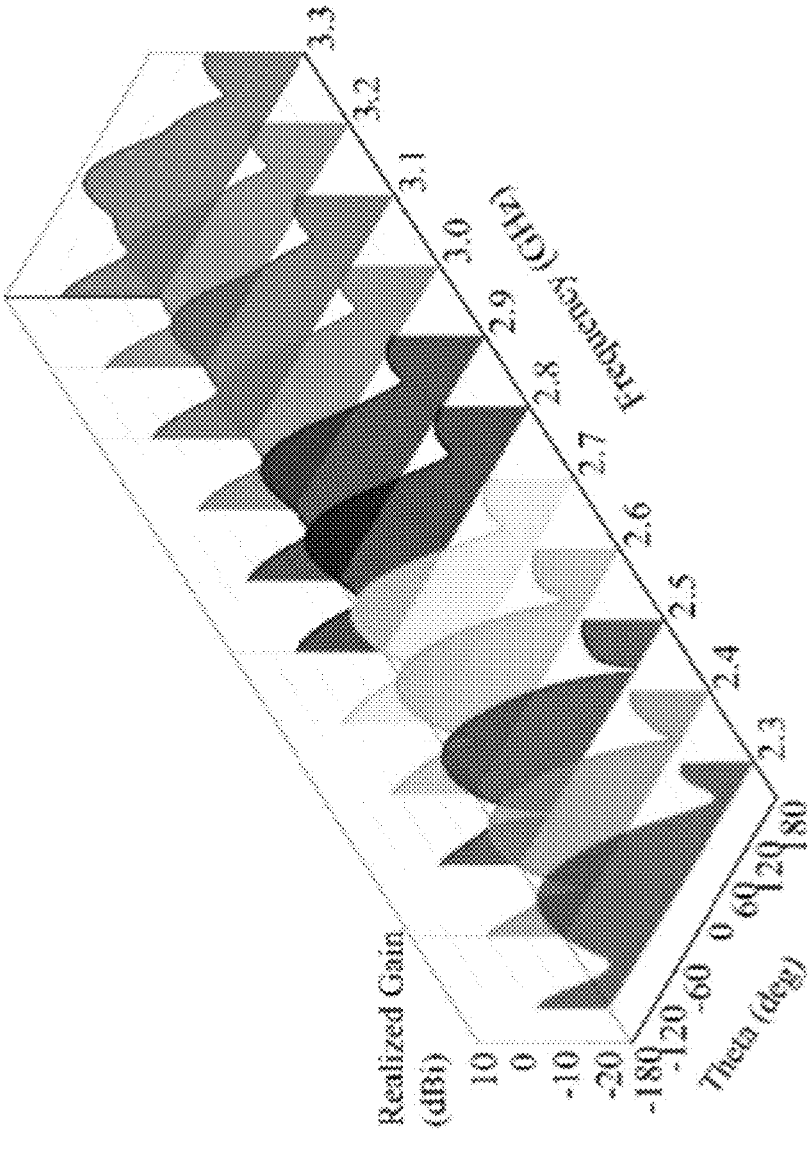
FIG. 7B is a graph showing simulated co-polarised fields of the H-plane of an antenna according to an embodiment of the present invention.

High-frequency structure simulator (HFSS) was used for the simulation during the antenna design process. FIGS. 6A and 6B show the simulated electric field distributions of the proposed antenna at 2.45 GHz and 3 GHZ. The more vital fields are concentrated on the edge of the patch near the L probe. FIGS. 7A and 7B show the simulated co-polarized fields of the E- and H-planes of the proposed antenna. It is observed that the patterns remain similar within the passband at both planes.

Figure 8:
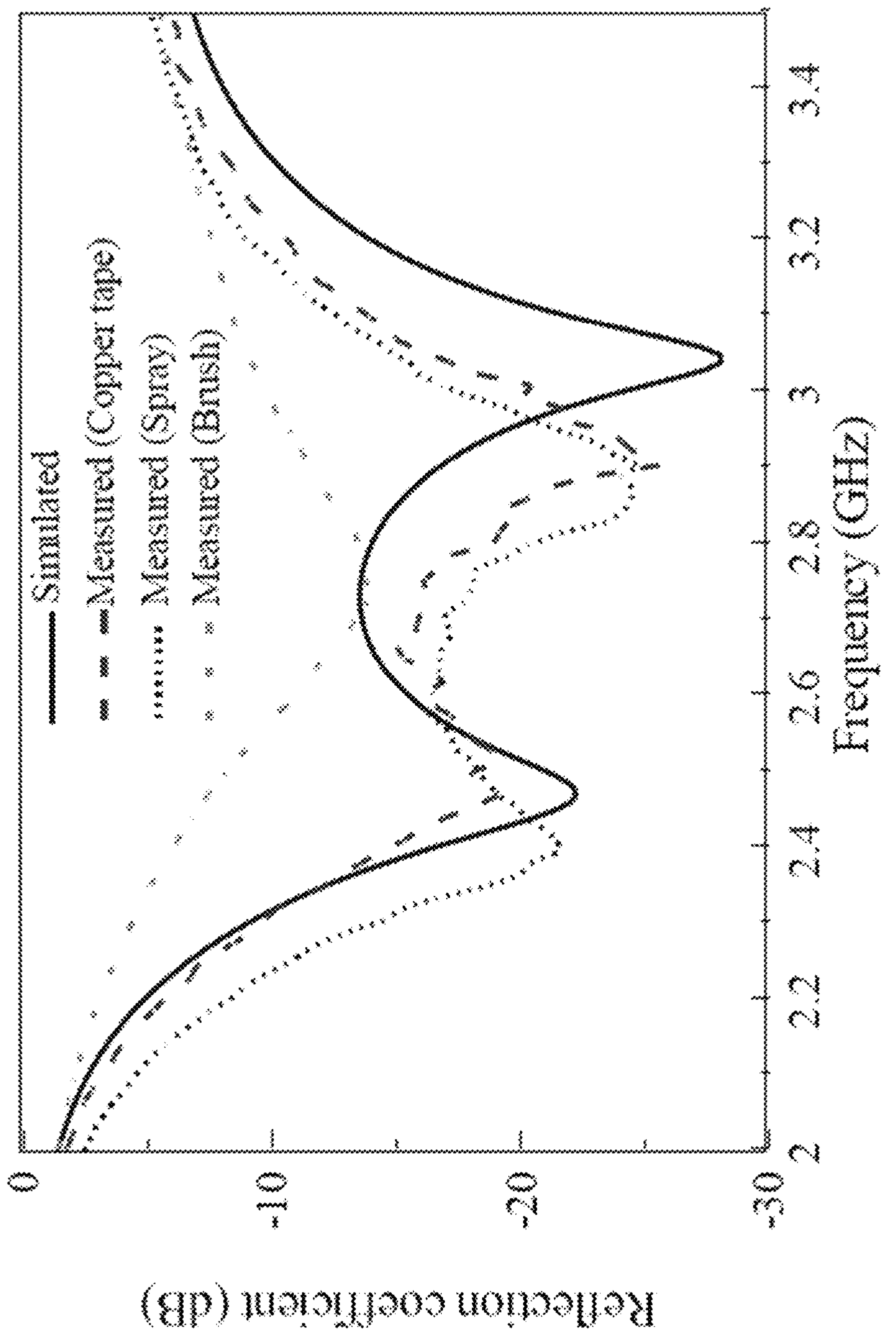
FIG. 8 is a graph showing simulated and measured reflection coefficients (dB) of the control antenna of FIG. 5A (simulated and measured), the antenna of FIG. 5B (measured), and the antenna of FIG. 5C (measured), at different frequencies (GHz)
Figure 9:
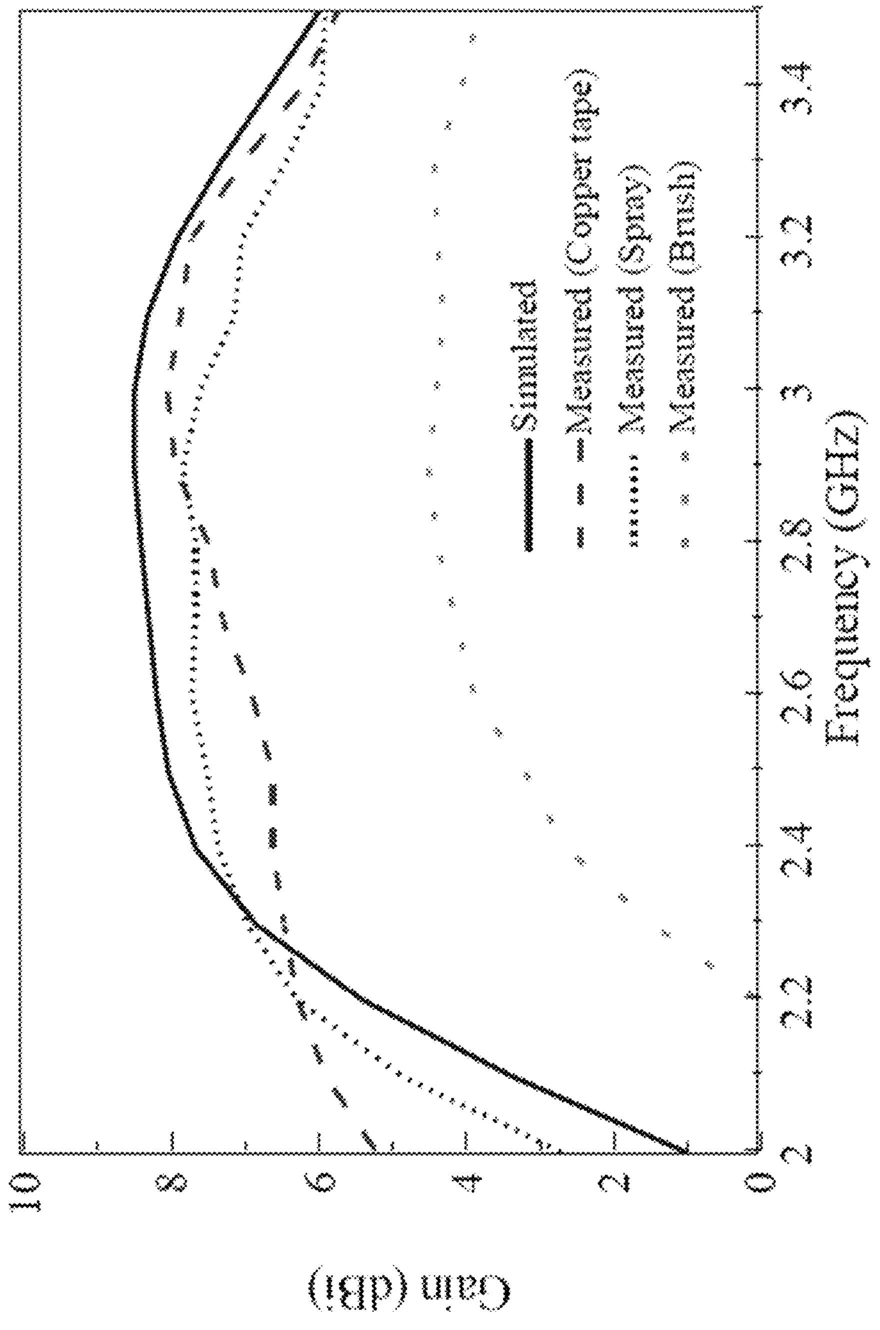
FIG. 9 is a graph showing simulated and measured gain (dBi) of the control antenna of FIG. 5A (simulated and measured), the antenna of FIG. 5B (measured), and the antenna of FIG. 5C (measured), at different frequencies (GHz)
Figure 10:
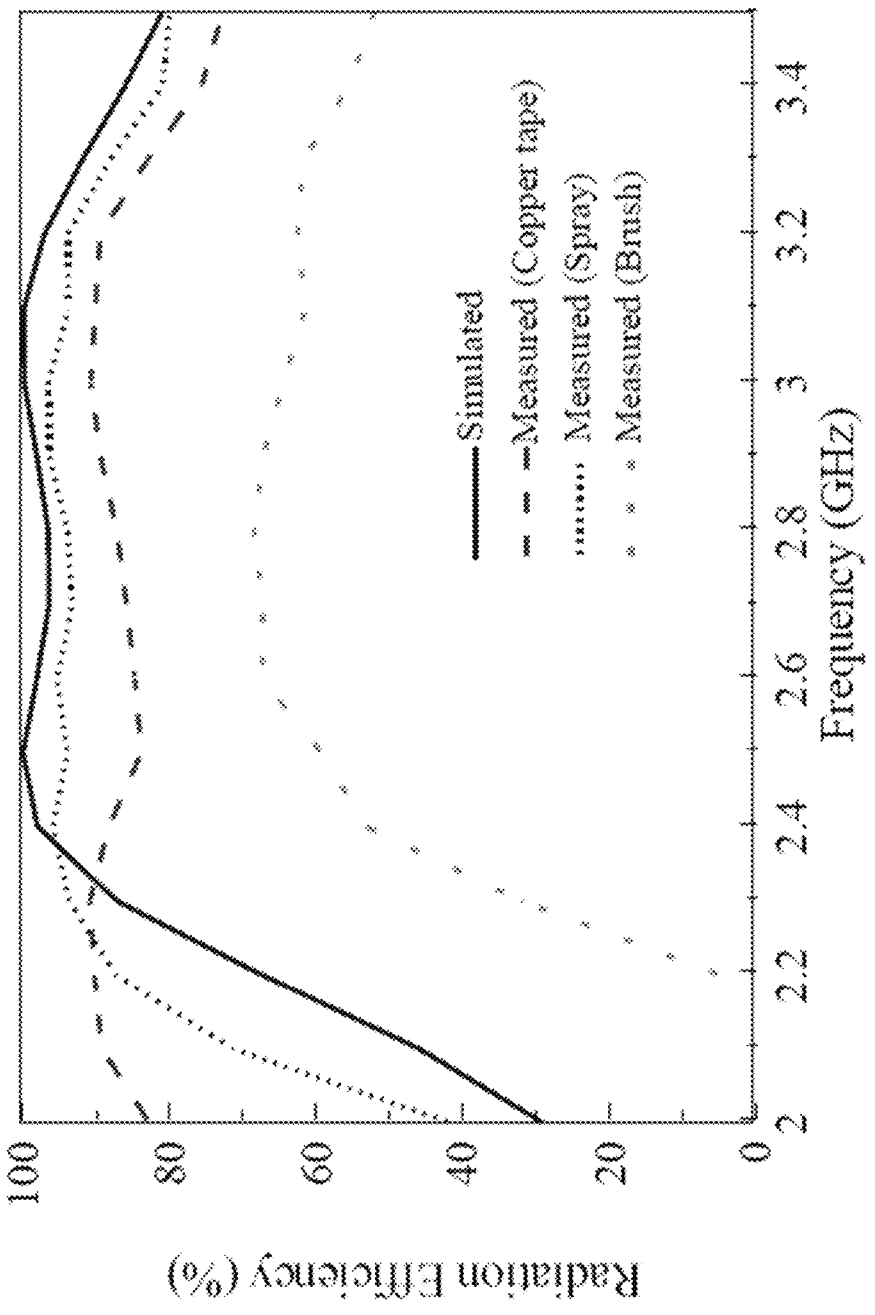
FIG. 10 is a graph showing simulated and measured radiation efficiencies (%) of the control antenna of FIG. 5A (simulated and measured), the antenna of FIG. 5B (measured), and the antenna of FIG. 5C (measured), at different frequencies (GHz)
Figure 11A:
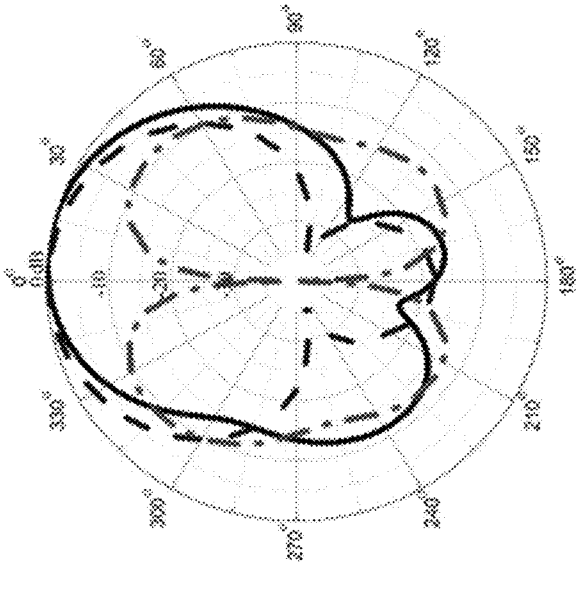
FIG. 11A is a plot showing simulated radiation patterns (co-polar and cross polar; E-plane and H-plane) of the control antenna in FIG. 5A at an operation frequency of 2.45 GHZ.
Figure 11B:
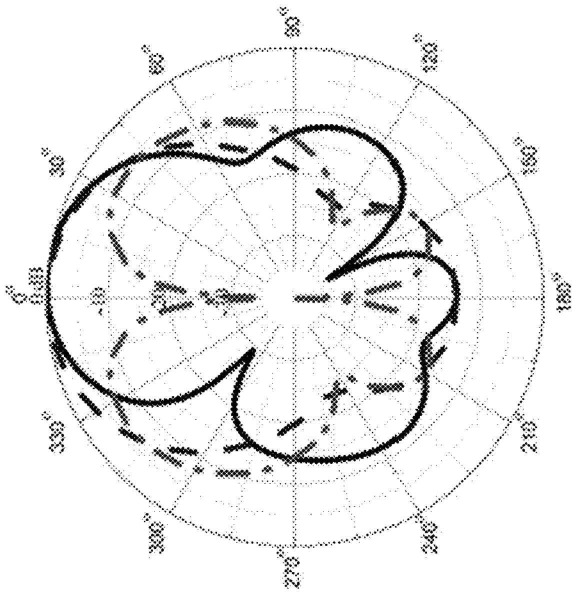
FIG. 11B is a plot showing simulated radiation patterns (co-polar and cross polar; E-plane and H-plane) of the control antenna in FIG. 5A at an operation frequency of 3 GHZ.

The reflection coefficient is measured by an Agilent ENA E5071C, whereas the gain, radiation efficiency, and radiation pattern were measured with a Satimo StarLab antenna measurement system. The reflection coefficient measurement of the prototypes in FIG. 8, which shows that conductive spray has the best performance in this measurement among the three materials. It has an impedance bandwidth of 40% (from 2.2 GHz to 3.3 GHZ) while conductive paint has only 15.8% (from 2.56 GHZ to 3 GHZ) and copper tape has 32.5% (from 2.32 GHz to 3.22 GHZ). The measurement shows similarity with the simulated results using the conductive spray. From FIG. 9, it is observed that conductive spray has a higher gain than conductive paint. The maximum gain of conductive spray was 7.09 dBi at 2.6 GHz while the maximum gain of conductive paint was only 4.47 dBi at 2.9 GHZ. Also, it is observed that the radiation efficiency of conductive spray is higher than that of conductive paint in FIG. 10. It had an efficiency of over 80% within the passband. In comparison, conductive paint only had an efficiency of not greater than 70%.

From FIGS. 11A to 14B, it is observed that the radiation patterns of copper tape and conductive spray were similar to the simulated results. In contrast, the radiation patterns of conductive paint show that it has a relatively large cross-polarization on both the E-plane and H-plane at both 2.45 GHz and 3 GHz frequencies when compared to the other prototypes.

Figure 15B:
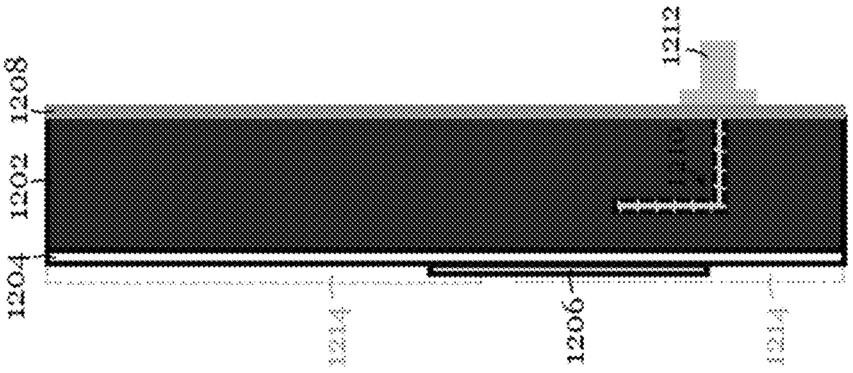
FIG. 15B is a schematic diagram (side view) of the antenna-integrated article of FIG. 15A.
Figure 15A:
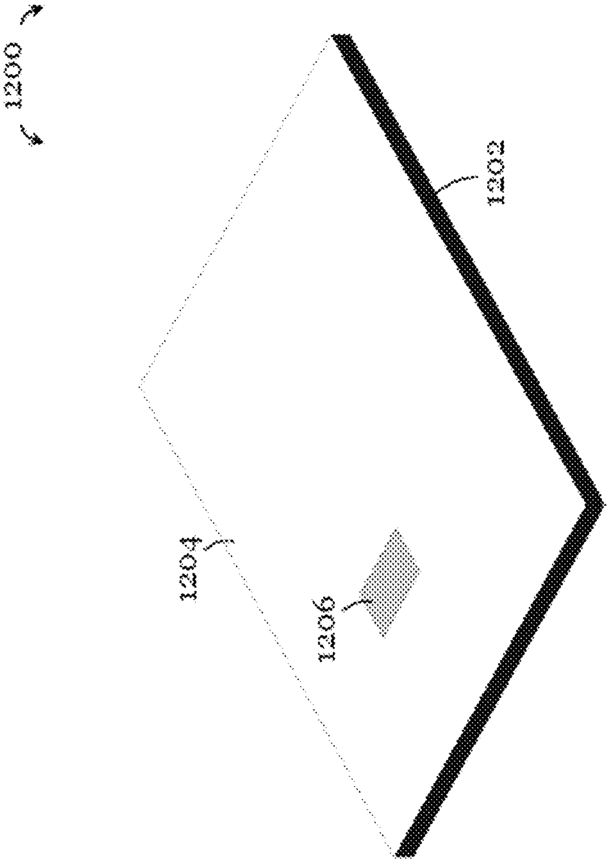
FIG. 15A is a schematic diagram (perspective view) of an antenna-integrated article in one embodiment of the invention.

FIGS. 15A and 15B illustrate an antenna-integrated article 1200 in one embodiment of the invention. The antenna-integrated article 1200 includes an article and an antenna integrated or combined with the article. In this embodiment, the antenna-integrated article 1200 includes a generally rectangular frame 1202 with two pairs of opposite frame arms. The frame 1202 may be made of wood.

A canvas 1204 for painting is mounted to the frame 1202, generally covering the front side of the frame 1202. One or more electrically non-conductive materials 1214 (e.g., electrically non-conductive paint such as oil paint) may be applied on the canvas 1204. A radiating patch 1206, which is generally rectangular and made of electrically conductive material(s), is spray-painted on part of the surface of the canvas 1204. In this example, the radiating patch 1206 has a length of 40 cm and a width of 30 cm. A ground plane 1208 is disposed at a back side of the frame 1202. The ground plane 1208 may have generally the same cross section as the canvas 1204. In this example, the ground plane 1208 and the electrically conductive patch 1206 on the canvas 1204 are spaced apart by about 15 mm (e.g., separated by the frame 1202).

A generally L-shaped feed probe 1210 is disposed in a space defined between the frame arms of the frame 1202, and between the canvas 1204 and the ground plane 1208, hence is normally hidden from view. The generally L-shaped feed probe 1210 includes: a first portion that extends generally perpendicular to the canvas 1204 and/or the ground plane 1208, and a second portion that extends generally parallel to the plane defined by the canvas 1204 and/or the plane defined by the ground plane 1208. At least part of (e.g., at least half of) the second portion is disposed in a space between the electrically conductive patch 1206 and the ground plane 1208. A feed port 1212 electrically connected with the generally L-shaped feed probe 1210 is arranged at a back side of the ground plane 1208. Although not shown, the ground plane 1208 defines an opening through which the first portion of the generally L-shaped feed probe 1210 may pass to electrically connect with the feed port 1212.

In this embodiment, the radiating patch 1206, the ground plane 1208, the frame 1202, and the feed including the generally L-shaped feed probe 1210 and the feed port 1212 may together define or form the antenna integrated or combined with the article. The frame 1202 may provide an electrical insulator structure supporting the electrically conductive patch 1206 relative to the ground plane 1208 such that the two are spaced apart.

In this embodiment, the canvas 1204 and the one or more electrically non-conductive materials 1214 may together define or form the article. The canvas 1204 may include or provide a base on which the radiating patch 1206 is applied. The one or more electrically non-conductive materials 1214 may cover part of the radiating patch 1206 such that only part of the radiating patch 1206 is visible. In one embodiment, the one or more electrically non-conductive materials 1214 and at least part of the electrically conductive patch 1206 together define a decorative arrangement (e.g., one or more colors and/or one or more patterns that form an image or part of an image) to camouflage the antenna.

It should be appreciated that various modifications can be made to the antenna-integrated article 1200 to provide other embodiments. For example, the canvas can be replaced with other substrate (e.g., paper, cardboard, etc.). For example, the shape and/or size of one or more of the frame, the ground plane, the canvas, and the electrically conductive patch may be different from those illustrated. For example, the location of the generally L-shaped feed probe may be different from that illustrated. For example, the type of feed port used may be different from that illustrated. For example, electrically non-conductive paint may be applied on any part of the canvas. For example, electrically non-conductive paint may be further applied on the electrically conductive patch.

It has been shown in FIGS. 8 to 14B that conductive spray has better performance than the conductive paint. Therefore, a preferred embodiment of the present invention is fabricated using conductive spray instead of conductive paint. The center of the radiating patch 1206 is located at the coordinate (79.5 mm, −37 mm) and is built on the canvas 1204 with a length of 40 cm and a width of 30 cm. The ground plane 1208 has generally the same size as the canvas 1204, and the ground plane 1208 is separated from the radiating patch 1206 by the wooden frame 1202 with a height of 15 mm.

Figure 16:
FIG. 16 is a photograph showing an antenna-integrated article that includes the antenna of FIG. 5C in one example.

FIG. 16 shows an antenna-integrated article that includes the antenna 1600, wherein the radiation element of the antenna 1600 is coated with an electrically conductive ink by spray-painting. FIG. 16 only shows the front view. In this example, the antenna-integrated article is a painting. In FIG. 16, the generally L-shaped feed probe and ground plane of the antenna is placed behind the painting hence not visible, and the antenna element with electrically conductive paint applied by spray-painting is partly covered with oil paint (non-conductive) and forms part of the painting. FIG. 16 illustrates the location of the electrically conductive paint in the antenna-integrated article in this embodiment.

Figure 17:
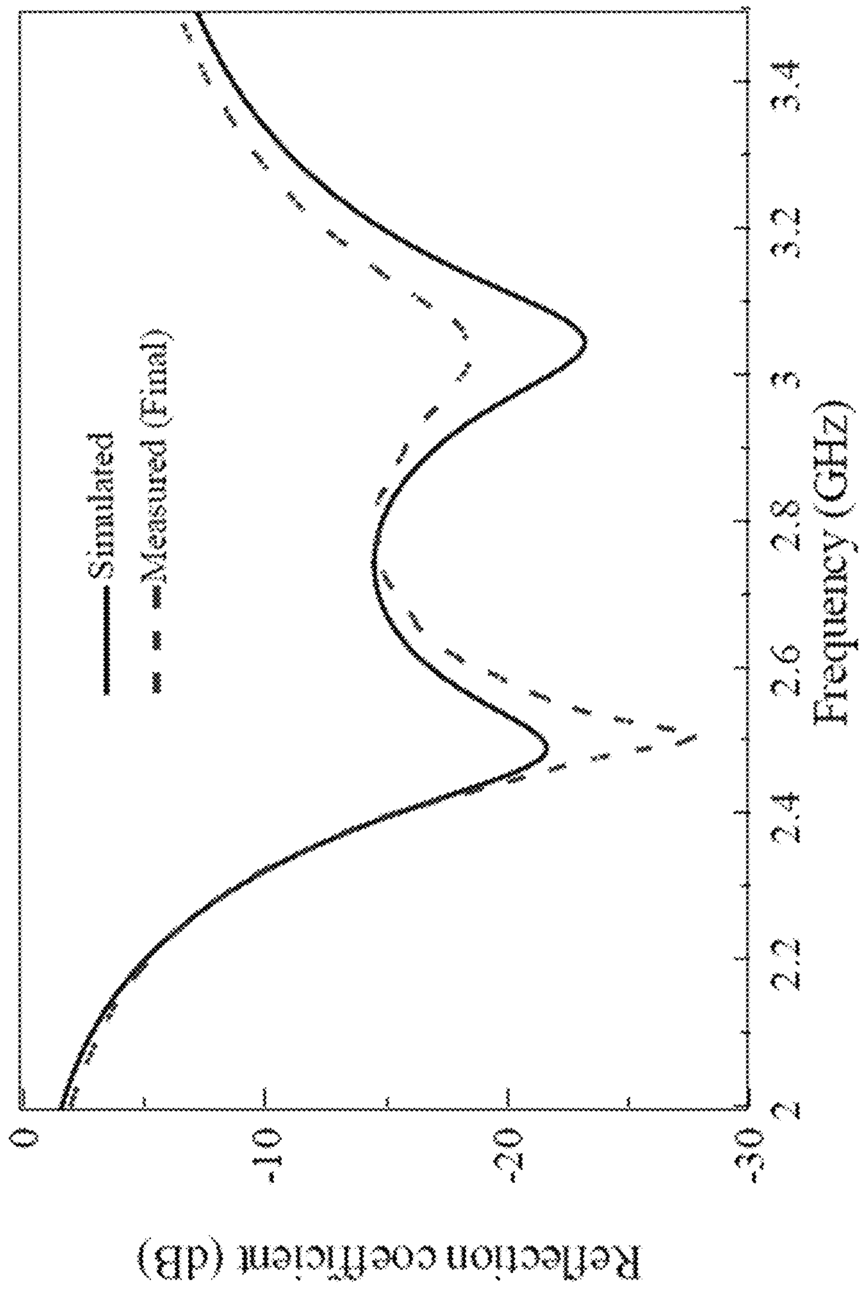
FIG. 17 is a plot showing simulated and measured reflection coefficients (dB) of the antenna in the antenna-integrated article in FIGS. 15A and 15B (simulated) and the antenna in the antenna-integrated article in FIG. 16 (measured), at different frequencies (GHz)
Figure 18:
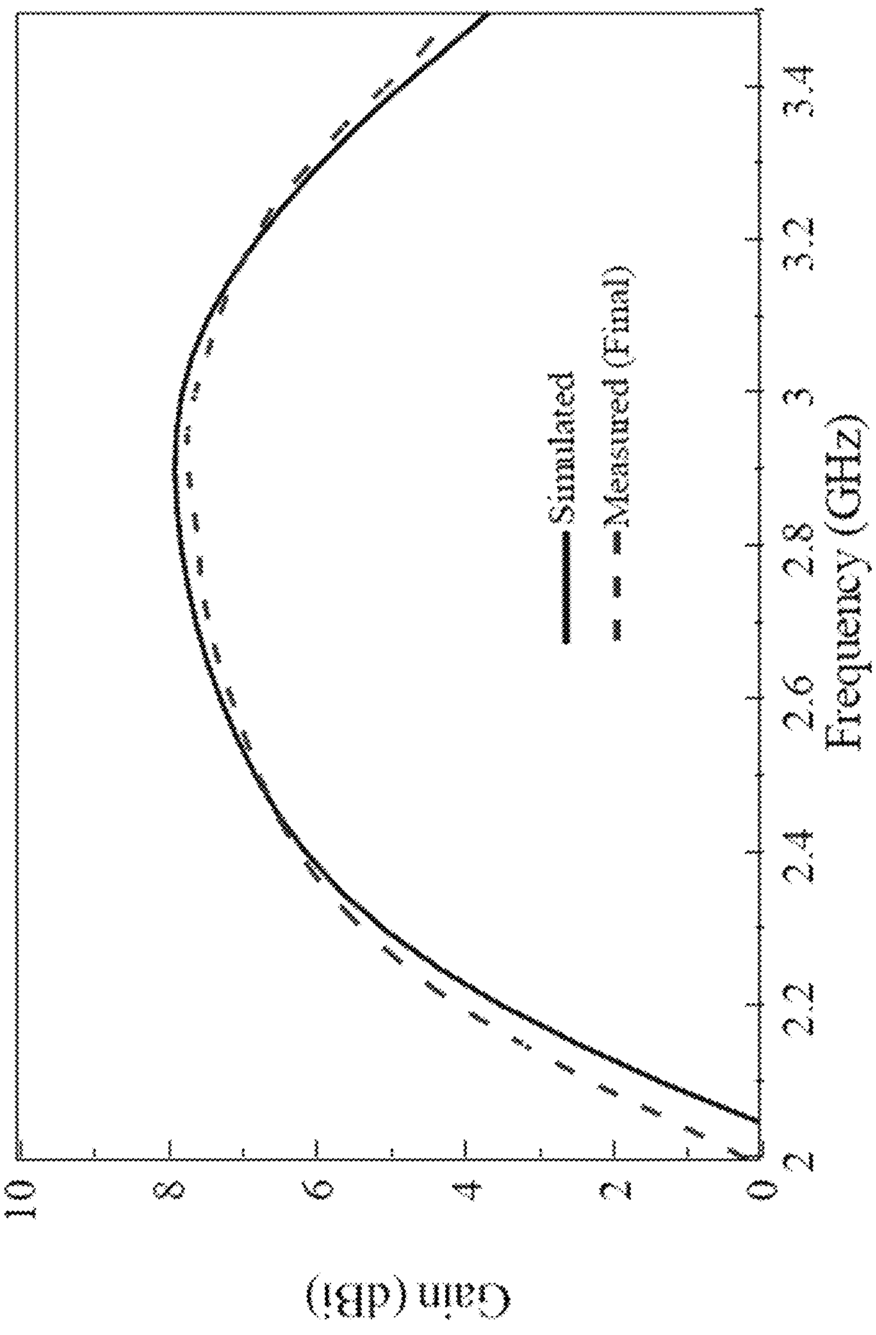
FIG. 18 is a plot showing simulated and measured gain (dBi) of the antenna in the antenna-integrated article in FIGS. 15A and 15B (simulated) and the antenna in the antenna-integrated article in FIG. 16 (measured), at different frequencies (GHz)

The dimension of the conductive spray patch in the antenna in FIGS. 15A and 15B is the same as in Table I except that the length and width of the ground plane (40 cm×30 cm) is the same as the canvas. FIG. 17 shows the measured and simulated reflection coefficients of the antenna with a conductive spray patch. The measured impedance bandwidth is 34.4% with the frequency is from 2.325 GHz to 3.29 GHz. The measured and simulated gains of the antenna with a conductive spray patch are displayed in FIG. 18, wherein it is observed that a maximum the gain of 7.7 dBi is achieved.

Figure 19:
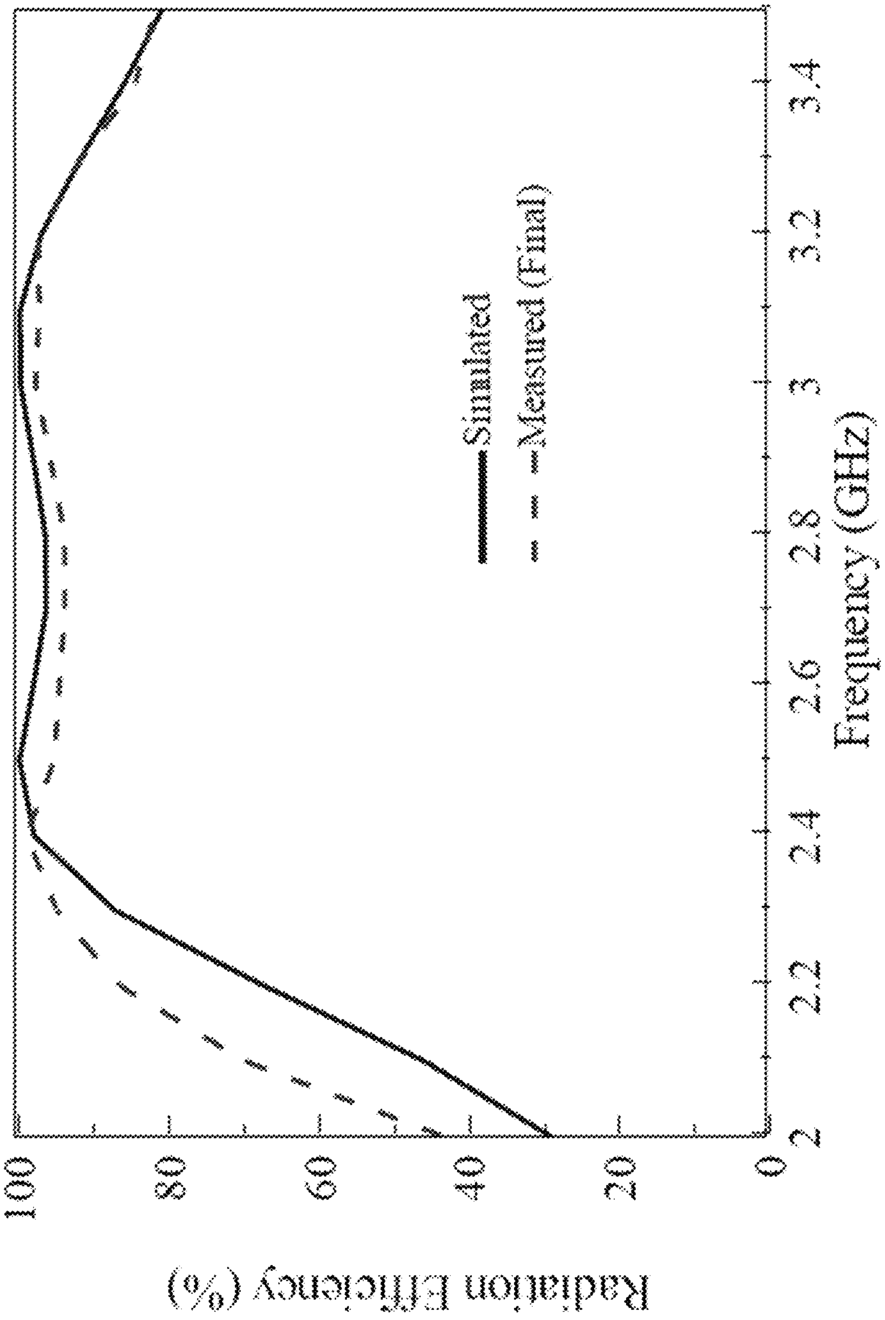
FIG. 19 is a plot showing simulated and measured radiation efficiencies (%) of the antenna in the antenna-integrated article in FIGS. 15A and 15B (simulated) and the antenna in the antenna-integrated article in FIG. 16 (measured), at different frequencies (GHz)

FIG. 19 demonstrates the measured and simulated radiation efficiencies of the antenna with a conductive spray patch, it is shown that it has a higher efficiency than antennas painted by brush. The measured radiation efficiency was over 93% within the passband, which is satisfactory and very close to the radiation efficiency of the simulated results. The measured and simulated radiation patterns of the antenna with a conductive spray patch are depicted in FIGS. 20A to 21B.

Figures 20A, 20B:
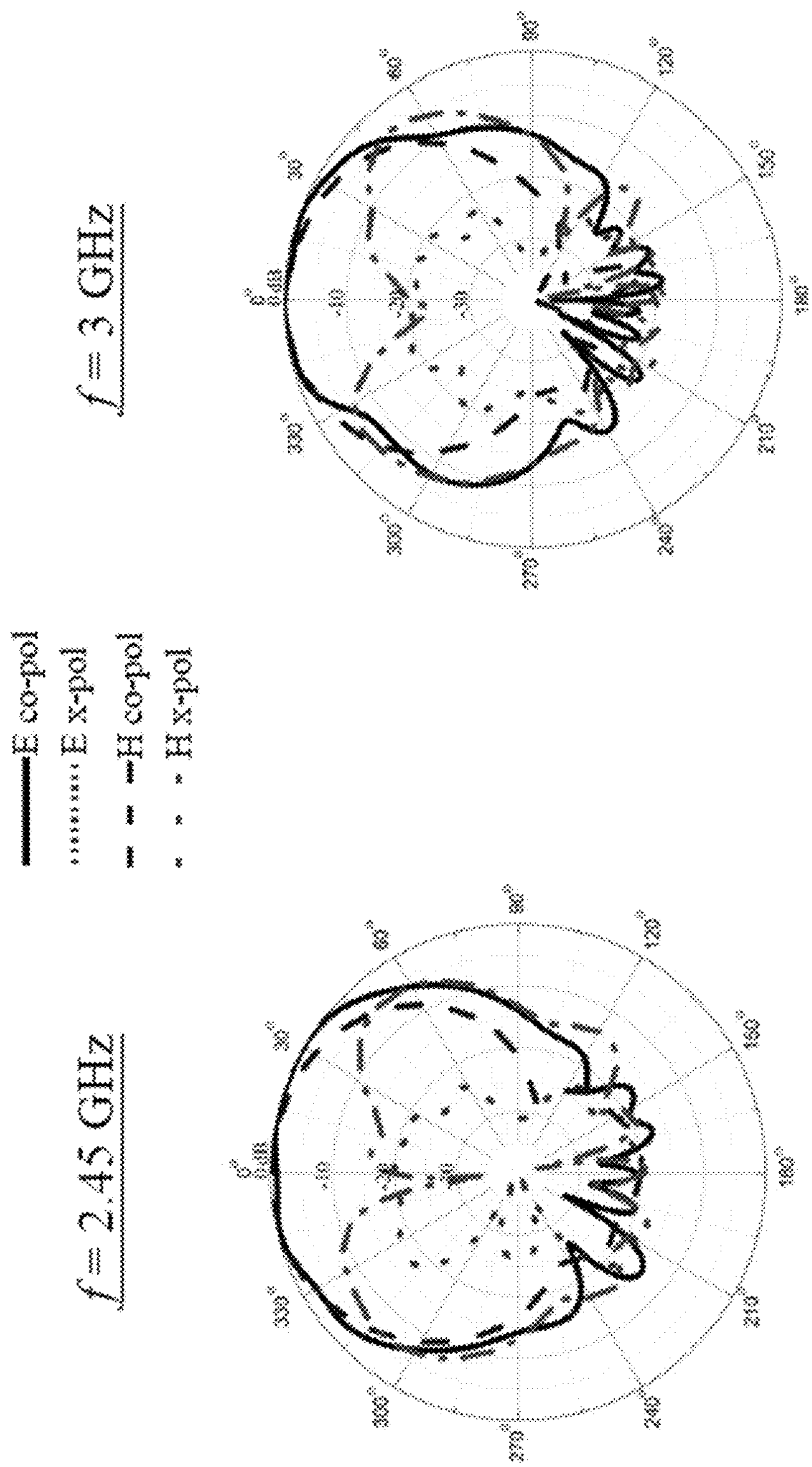
FIG. 20A is a plot showing simulated radiation patterns (co-polar and cross polar; E-plane and H-plane) of the antenna in the antenna-integrated article in FIGS. 15A and 15B at an operation frequency of 2.45 GHz in one example.
FIG. 20B is a plot showing simulated radiation patterns (co-polar and cross polar; E-plane and H-plane) of the antenna in the antenna-integrated article in FIGS. 15A and 15B at an operation frequency of 3 GHz in one example.

In particular, FIGS. 20A and 20B show simulated radiation patterns (co-polar and cross polar; E-plane and H-plane) the antenna in the antenna-integrated article 1200 in FIGS. 15A and 15B at 2.45 GHZ and 3 GHz respectively. The simulation results are produced using software HFSS.

Figure 21B:
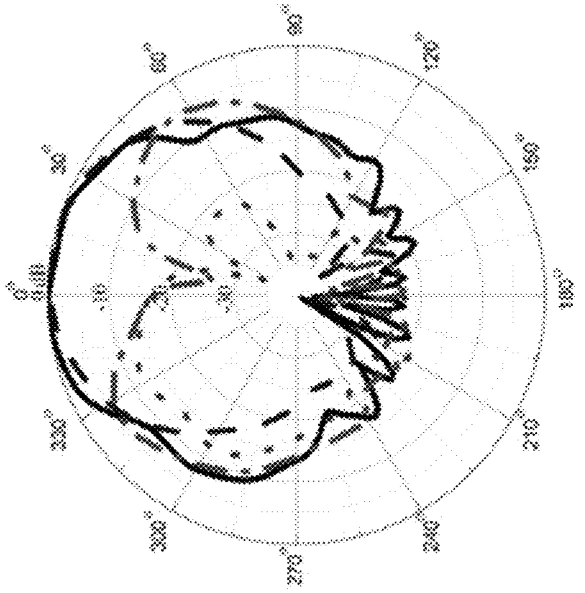
FIG. 21B is a plot showing measured radiation patterns (co-polar and cross polar; E-plane and H-plane) of the antenna in the antenna-integrated article in FIG. 16 at an operation frequency of 3 GHz in one example.
Figure 21A:
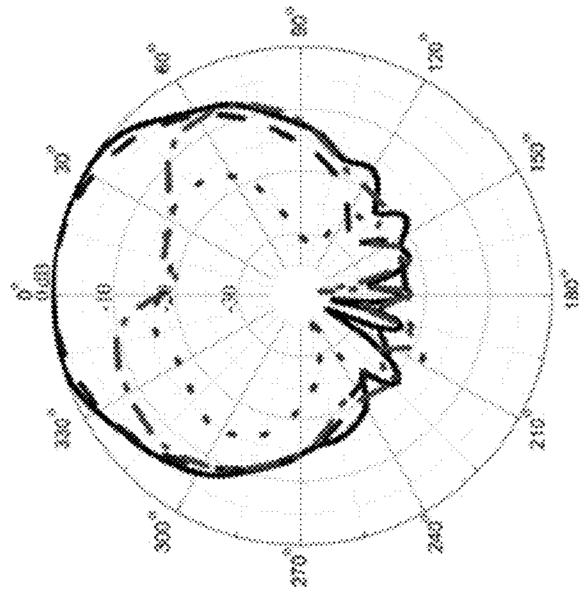
FIG. 21A is a plot showing measured radiation patterns (co-polar and cross polar; E-plane and H-plane) of the antenna in the antenna-integrated article in FIG. 16 at an operation frequency of 2.45 GHz in one example.

FIGS. 21A and 21B show measured radiation patterns (co-polar and cross polar; E-plane and H-plane) of the antenna in the antenna-integrated article in FIG. 16 at 2.45 GHz and 3 GHz respectively.

Figure 12B:
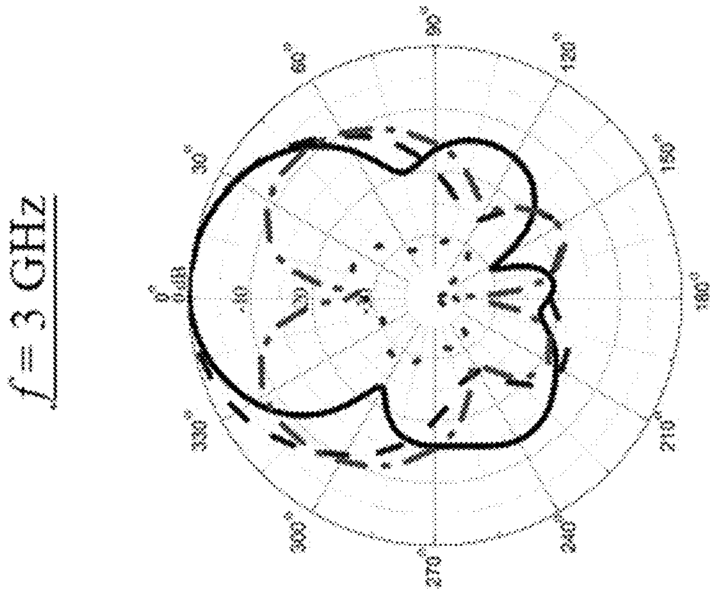
FIG. 12B is a plot showing measured radiation patterns (co-polar and cross polar; E-plane and H-plane) of the control antenna in FIG. 5A at an operation frequency of 3 GHZ.
Figure 12A:
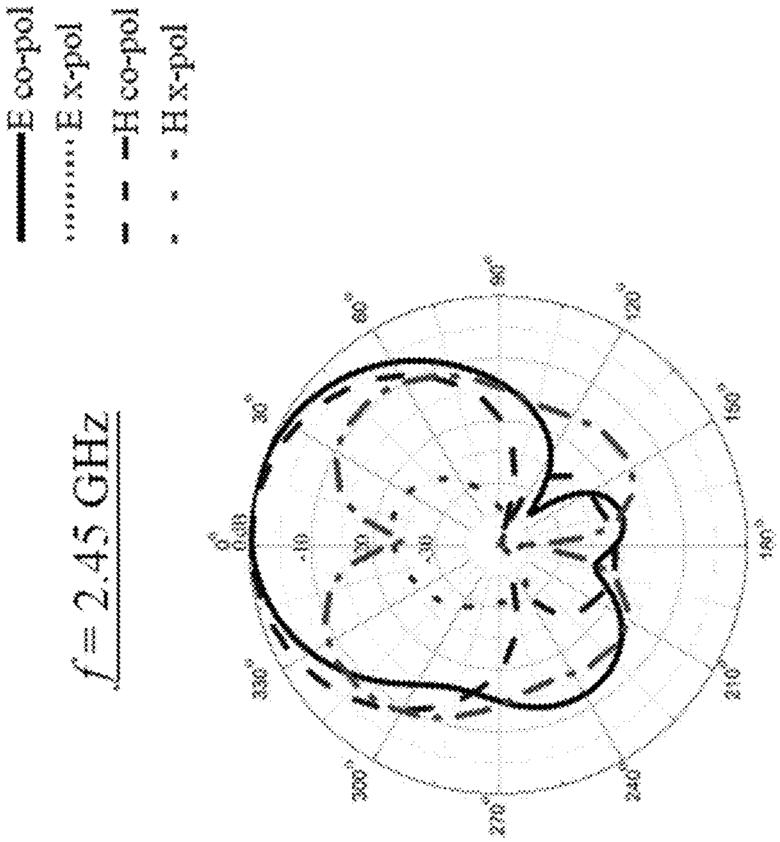
FIG. 12A is a plot showing measured radiation patterns (co-polar and cross polar; E-plane and H-plane) of the control antenna in FIG. 5A at an operation frequency of 2.45 GHZ.
Figure 13A:
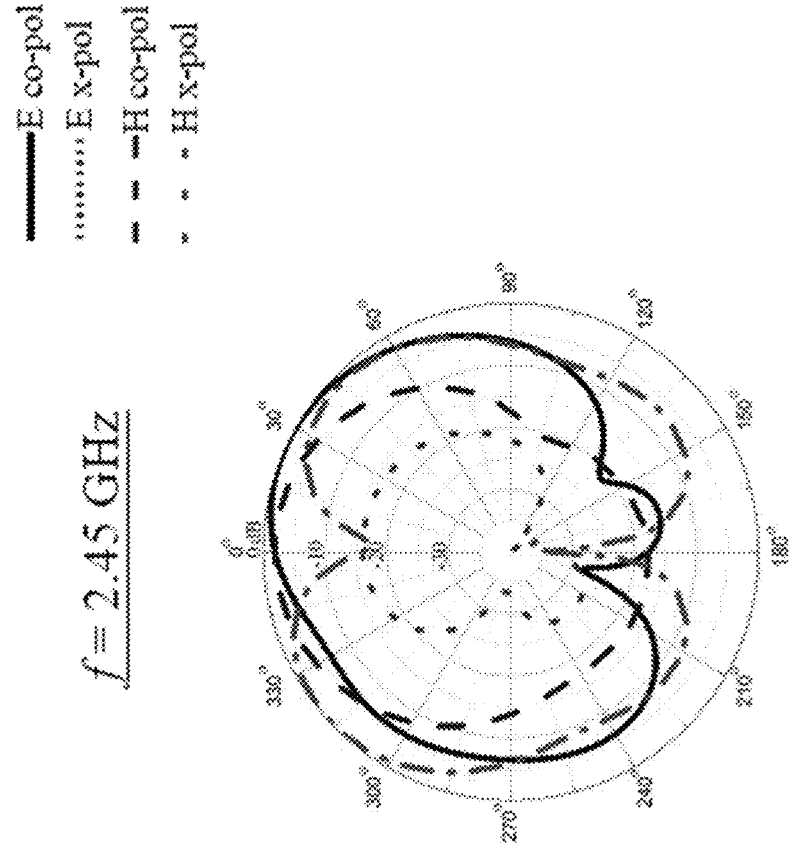
FIG. 13A is a plot showing measured radiation patterns (co-polar and cross polar; E-plane and H-plane) of the antenna in FIG. 5B at an operation frequency of 2.45 GHz in one example.
Figure 13B:
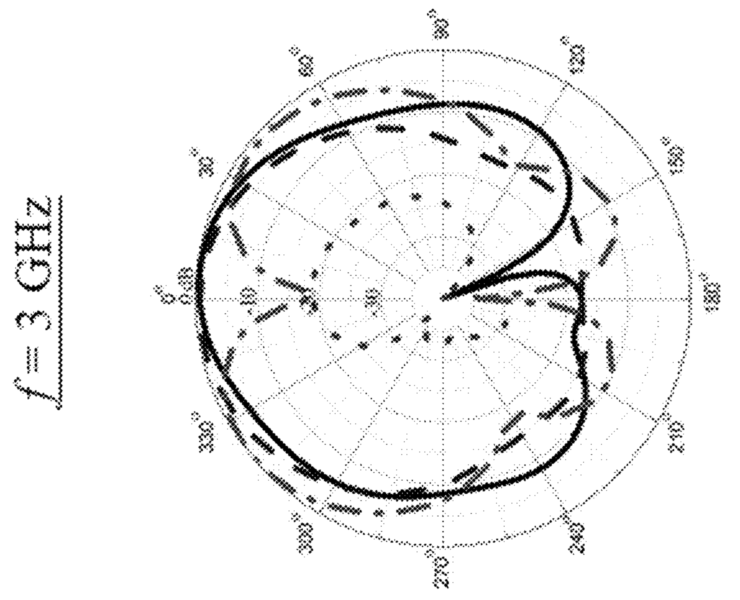
FIG. 13B is a plot showing measured radiation patterns (co-polar and cross polar; E-plane and H-plane) of the antenna in FIG. 5B at an operation frequency of 3 GHz in one example.
Figure 14A:
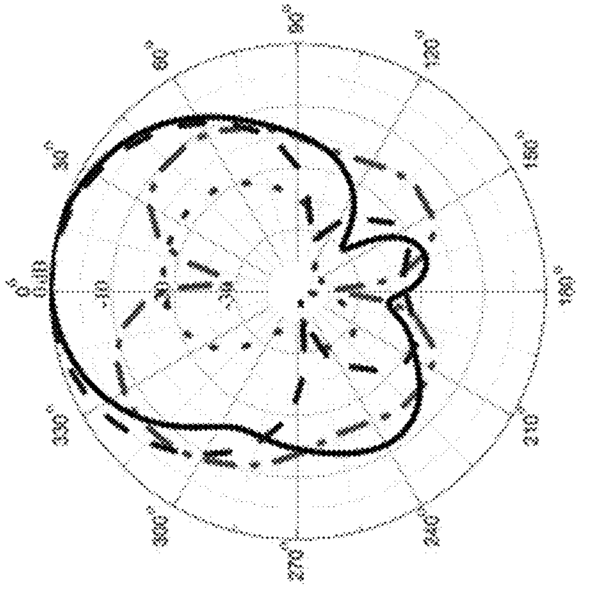
FIG. 14A is a plot showing measured radiation patterns (co-polar and cross polar; E-plane and H-plane) of the antenna in FIG. 5C at an operation frequency of 2.45 GHz in one example.
Figure 14B:
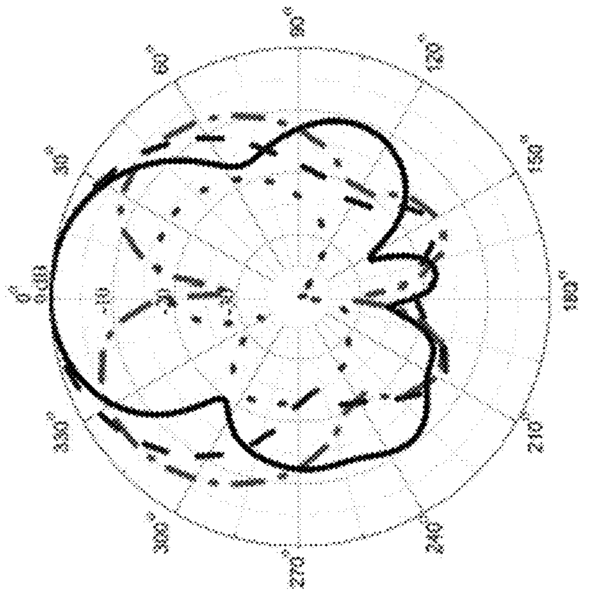
FIG. 14B is a plot showing measured radiation patterns (co-polar and cross polar; E-plane and H-plane) of the antenna in FIG. 5C at an operation frequency of 3 GHz in one example.

In this example, broadside (generally broadside) radiation can be obtained across the frequency band for both antennas of the antenna-integrated article 1200 in FIG. 12A/B and of the antenna in the antenna-integrated article in FIG. 16. In one example, (generally broadside) broadside radiation can be obtained by the antenna in the antenna-integrated article 1200 in FIGS. 15A and 15B across the frequency band of 2.325 GHz to 3.345 GHz. In one example, broadside (generally broadside) radiation can be obtained by the antenna in the antenna-integrated article in FIG. 16 across the frequency band of 2.325 GHz to 3.29 GHz.

Figure 22A:
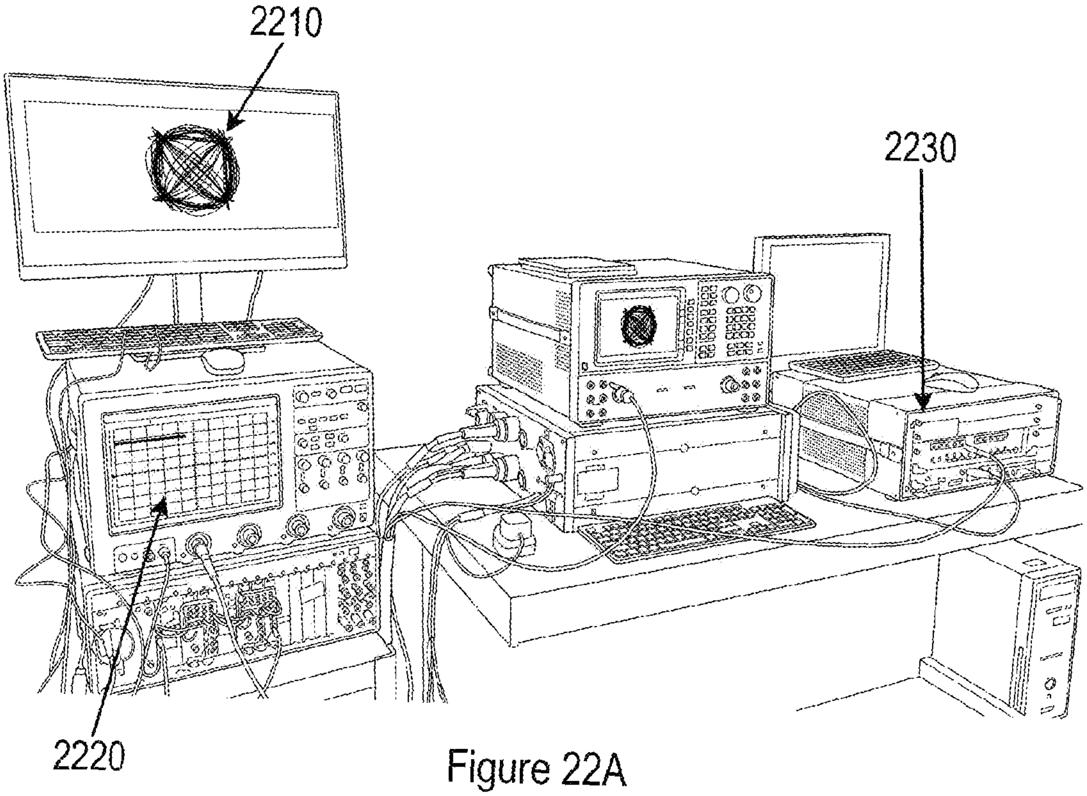
FIG. 22A is a photographic representation of an equipment setup for measuring digital modulations of the antenna-integrated article in FIGS. 15A and 15B outside an experimental chamber.
Figure 22B:
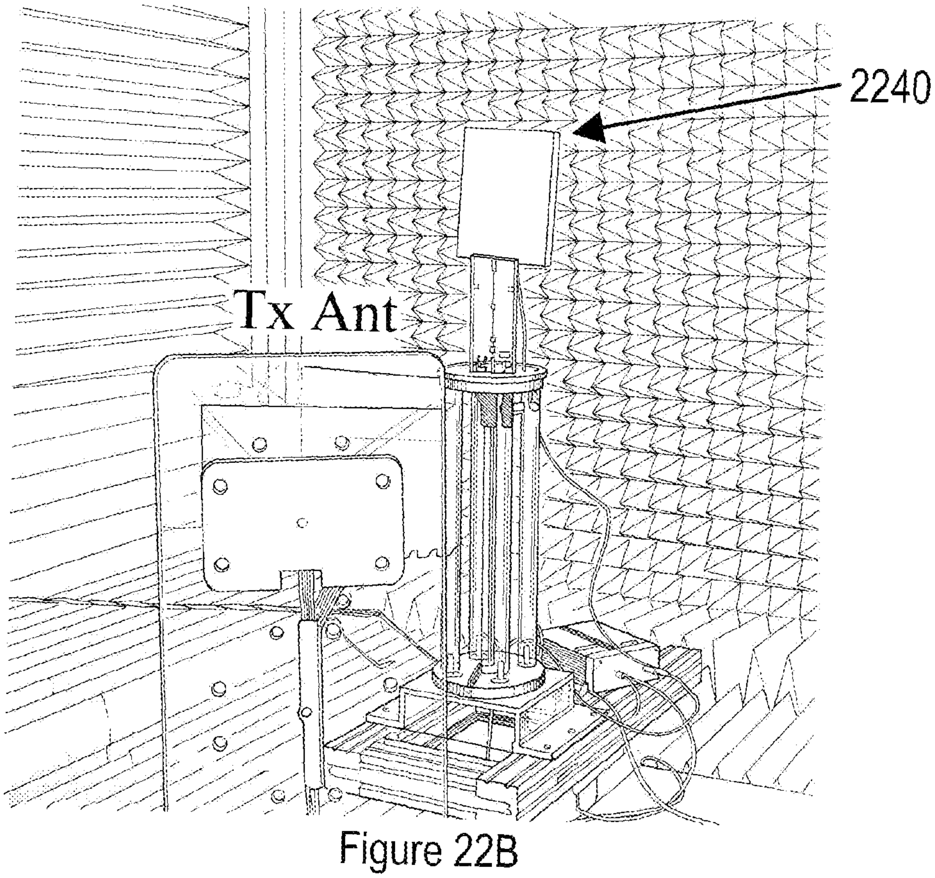
FIG. 22B is a photographic representation of an equipment setup for measuring digital modulations of the antenna-integrated article in FIGS. 15A and 15B within an experimental chamber.

FIGS. 22A and 22B show the measurement setup for digital modulations of the antenna 2240 with a conductive spray patch measured in the chamber, which includes a monitor for signal display 2210, a digital oscilloscope 2220, and an arbitrary waveform generator 2230.

Figure 23A:
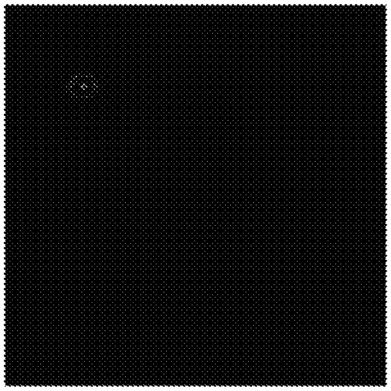
FIG. 23A is a constellation diagram of digital modulations of the antenna-integrated article of FIGS. 15*a* and 15B with an input sinusoidal signal at 2.45 GHZ.
Figure 23B:
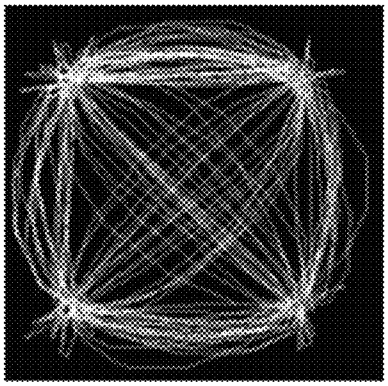
FIG. 23B is a constellation diagram of digital modulations of the antenna-integrated article of FIGS. 15*a* and 15B with an input QPSK at 2.45 GHz.
Figure 23C:
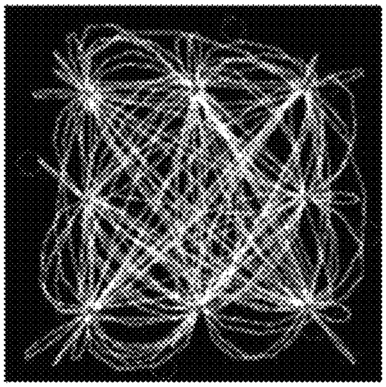
FIG. 23C is a constellation diagram of digital modulations of the antenna-integrated article of FIGS. 15*a* and 15B with an input 8-QAM at 2.45 GHz.
Figure 23D:
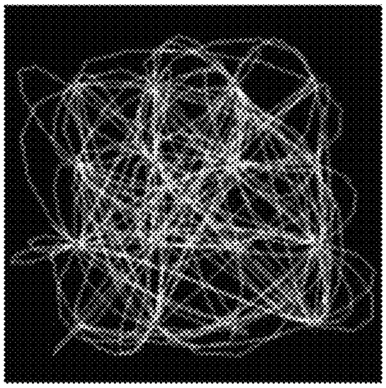
FIG. 23D is a constellation diagram of digital modulations of the antenna-integrated article of FIGS. 15*a* and 15B with an input 16-QAM at 2.45 GHz.
Figure 23E:
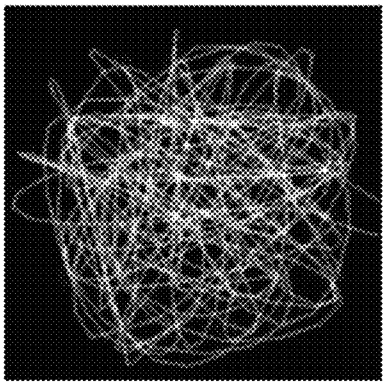
FIG. 23E is a constellation diagram of digital modulations of the antenna-integrated article of FIGS. 15*a* and 15B with an input 32-QAM at 2.45 GHz.
Figure 23F:
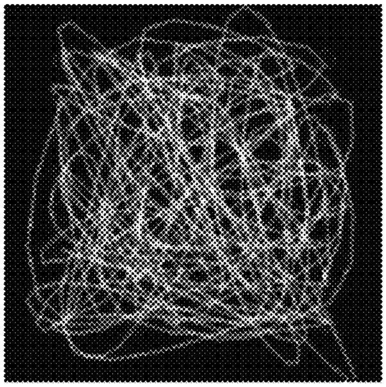
FIG. 23F is a constellation diagram of digital modulations of the antenna-integrated article of FIGS. 15*a* and 15B with an input 64-QAM at 2.45 GHz.
Figure 23G:
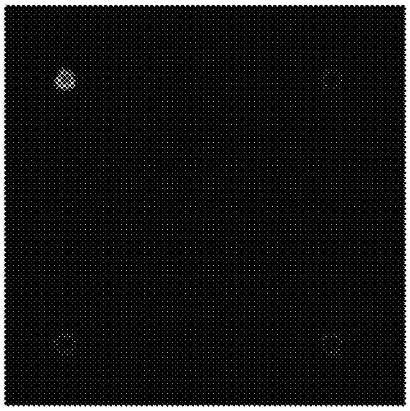
FIG. 23G is a constellation diagram of digital modulations of the antenna-integrated article of FIGS. 15*a* and 15B with an input sinusoidal signal at 3 GHZ.
Figure 23H:
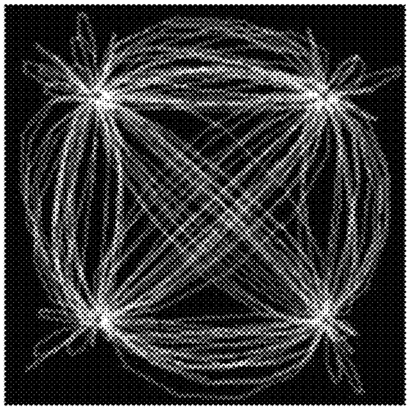
FIG. 23H is a constellation diagram of digital modulations of the antenna-integrated article of FIGS. 15*a* and 15B with an input QPSK at 3 GHZ.
Figure 23I:
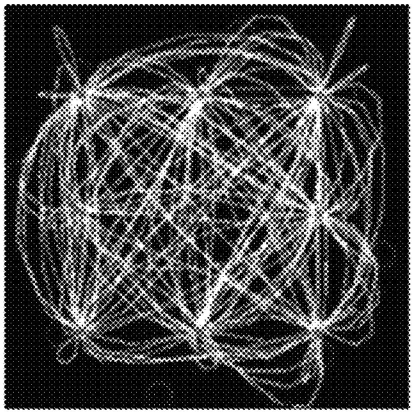
FIG. 23I is a constellation diagram of digital modulations of the antenna-integrated article of FIGS. 15*a* and 15B with an input 8-QAM at 3 GHZ.
Figure 23J:
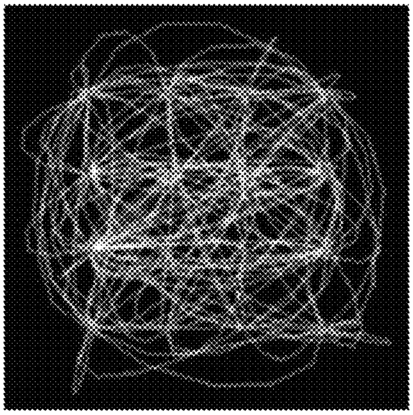
FIG. 23J is a constellation diagram of digital modulations of the antenna-integrated article of FIGS. 15*a* and 15B with an input 16-QAM at 3 GHZ.
Figure 23K:
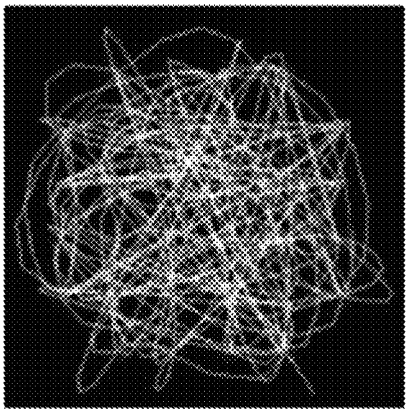
FIG. 23K is a constellation diagram of digital modulations of the antenna-integrated article of FIGS. 15*a* and 15B with an input 32-QAM at 3 GHz.
Figure 23L:
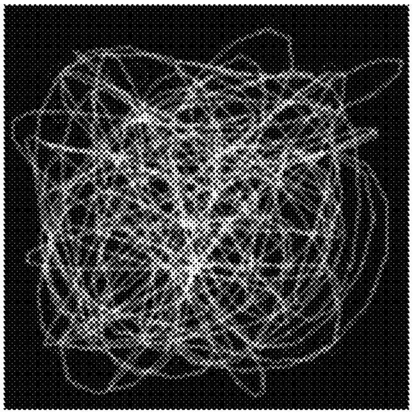
FIG. 23L is a constellation diagram of digital modulations of the antenna-integrated article of FIGS. 15*a* and 15B with an input 64-QAM at 3 GHZ.

As shown in FIGS. 23A and 23G, no modulated signal (only sinusoidal signal) is generated, so the measurement results show only one red dot. With reference to FIGS. 23B to 23F and FIGS. 23H to 23L, it is observed that the number of red dots, N is formed N=4 for QPSK and N-QAM are connected with tallow lines to establish communication with the modulated signal when using different modulations and at both 2.45 GHz and 3 GHz frequencies. Note that the constellations of these modulations have the shape of a square, except that of 32-QAM, which has the shape of an octagon. This means that the antenna with a conductive spray patch has satisfactory results at both resonant frequencies and was able to establish communications at these frequencies.

Figure 24B:
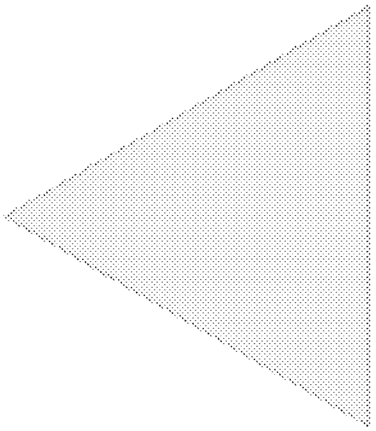
FIG. 24B is a schematic diagram (top view) of a radiation element of an antenna in another embodiment of the invention.
Figure 24A:
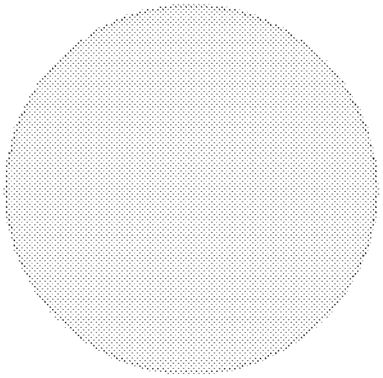
FIG. 24A is a schematic diagram (top view) of a radiation element of an antenna in an embodiment of the invention.

FIGS. 24A and 24B show two example variations of the shape of the antenna element. In FIG. 24A, the radiation element of the antenna is generally circular in plan view. In FIG. 24B, the radiation element of the antenna is generally triangular in plan view. The electrically conductive arrangement can made, e.g., by electrically conductive material(s) (sprayed, brush-painted, or applied otherwise).

Figure 25:
FIG. 25 is a photograph of an antenna array in one embodiment of the invention.

FIG. 25 shows an example antenna with an array of diamond shaped and triangular antenna elements. The array in this example is a grid like array. The antenna is operable as an antenna array. The antenna elements are provided by: a base (e.g., a substrate of a picture), and a plurality of diamond shaped electrically conductive arrangements spray-painted on the base. While not illustrated, the antenna in FIG. 25 also includes suitably feed mechanism (feed, ground plane, etc.) operably coupled with the antenna elements for operation.

Figure 26:
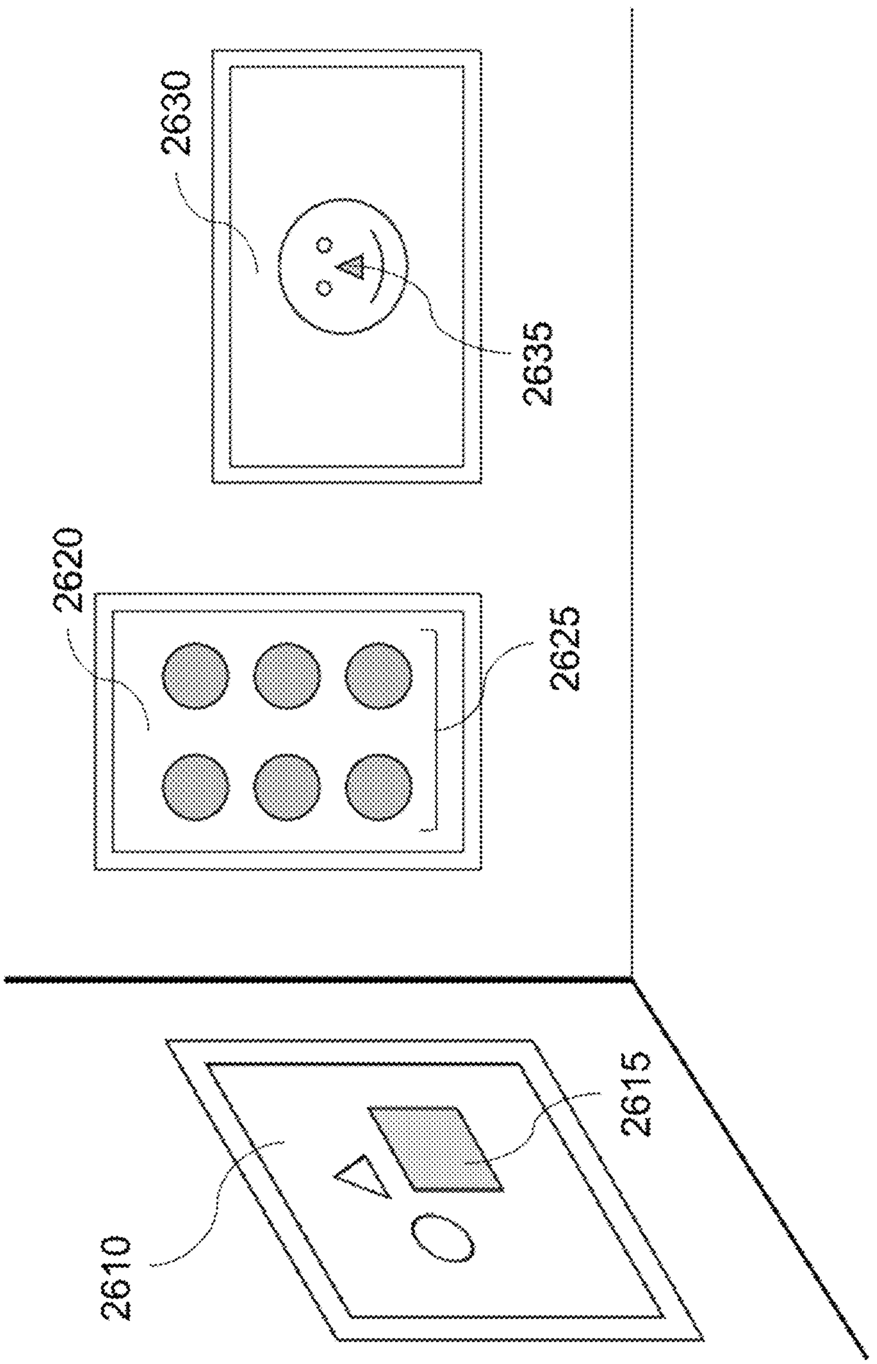
FIG. 26 is a schematic diagram showing an art gallery with antenna-integrated artworks in one embodiment of the invention.

FIG. 26 shows an art gallery space with three example antenna-integrated artworks 2610, 2620, 2630 in one embodiment. In this example, each of the antenna-integrated artworks 2610, 2620, 2630 includes an artwork and an antenna 2615, 2625, 2635 integrated or combined with the artwork. For each of the antenna-integrated artwork, the antenna includes a radiation element with a ground plane, with a dielectric member disposed between the radiation element and the ground plane such that the radiation element is not in contact with the ground plane. The antenna may be constructed based on any of the above antenna embodiments. In this embodiment, each of the antenna-integrated artwork is arranged such that the antenna element is visible and forms part of the artwork hence to camouflage or substantially conceal the antenna. In this example, the antenna elements of the antenna-integrated artworks are shown in grey color in FIG. 26. For the artwork 2620 with six antenna elements 2625, the antenna elements may provide an antenna array.

In one example, the antenna-integrated artwork may each also include a data storage (e.g., device, circuit, module) operably connected with the antenna and storing information associated with the artwork (e.g., description of the artwork, description of the artist(s) associated with the artwork, location of the artwork, etc.). The stored information can be communicated via the antenna to an external device (e.g., a computer, mobile phone, tablet computer, etc., of a user) within a communication range of the antenna.

In some embodiments, the art gallery space may include one or more sensors for detecting presence of external device proximal to the artwork. In some examples, the information associated with the artwork may be provided to the external device in response to detection of the presence of the external device in proximity to the artwork.

Some embodiments of the invention provide a "painting antenna", i.e., an antenna is hide in, concealed in, or blend in a painting. The "painting antenna" may have relatively wide bandwidth characteristic which can increase the channel capacity. The "painting antenna" may achieve relatively stable gain, relatively high radiation efficiency, and desirable radiation pattern across the operation frequency band. In some embodiments, the antenna includes a patch antenna element made at least partly based on inkjet printing technology (e.g., spray-painting of electrically conductive material(s) (e.g., ink, paint, spray, etc.) to form a conductive radiator element). In some examples, the patch antenna element may be made cost effectively and/or may have a relatively light weight (compared to a tape). In some examples, electrically conductive material(s) can be used efficiently to form a patch antenna element. In some embodiments, the antenna elements can be arranged to form an antenna array, which can be used to form an Internet of Things (IoT) gateway. In some embodiments, the antenna may be integrated or combined with artworks, and sensors with IoT communication protocol(s) may be installed in or coupled to the artworks for introducing the artworks and/or their location in an art gallery. The antenna in some embodiments has a simple structure and/or a low profile.

In some embodiments, there is provided an antenna-integrated article with an antenna having an antenna element, which includes an electrically conductive arrangement brush-painted or spray-painted on a base. The quality of performance of the antenna may be related to the precision and smoothness of the paint brush-painting or spray-painting process. In some embodiments, the antenna-integrated article is an artwork (e.g., picture or painting). In some embodiments, the antenna includes a simple feed mechanism, with an L-shaped feed probe and a ground plane. In some embodiments, the antenna-integrated article can be used in or for facilitating IoT exhibition applications.

The antenna in some embodiments can provide a low profile wideband antenna with good characteristics, such as one or more of: stable gain, high radiation efficiency, and desirable radiation pattern over an operating frequency range, hence is suitable for use in IoT applications. The antenna in some embodiments is particularly suitable for use in modern wireless communication systems.

Some embodiments of the invention provide a wideband painting antenna with good mechanical and electrical characteristics. Some embodiments of the invention provide an antenna that can be hidden in an artwork (e.g., a picture or a painting) and can save space, which may facilitate green communication. Some embodiments of the invention provide an antenna that can be used to construct an IoT gateway. Some embodiments of the invention provide an antenna can be applied in an antenna array.

In summary, it was investigated that conductive spray was a good solution for antenna design when compared with conductive paint. A painting patch antenna was designed with an operating frequency of 2.45 GHz with an impedance bandwidth of over 30%, which has two resonant frequencies at around 2.45 GHz and 3 GHz. This aesthetic painting antenna was fabricated using conductive spray and had a satisfying performance as a painting L-probe antenna in that it had similar performance with the simulation in different types of measurement, including reflection coefficient, radiation patterns, gain, and radiation efficiency. The proposed painting antenna could be installed in the IoT gateway of innovative art galleries, seamlessly functioning as NFC tags or RFID readers.

For NFC tags, the typical physical art labels next to the artworks used in art galleries could be substituted to provide information about the artwork and the artist. The visitors could use their phones to read the NFC tag and get access to the information page. This would also help to reduce the material used for the fabrication of the art labels and reduce waste. RFID readers could provide a security measure for the art gallery.

The invention claimed is:

1. An antenna attachable to an article, comprising:

(i) a radiation element, (ii) a ground plane opposing the radiation element, (iii) a dielectric member disposed between the radiation element and the ground plane, separating the radiation element from the ground plane, and (iv) a feed extending toward the radiation element from the ground plane and not in contact with the radiation element, wherein at least part of a surface of the radiation element is coated with an electrically conductive ink that enables decorative design, such that the antenna is configured to be camouflaged against a surface of the article, wherein the feed is an L-shaped probe having a first portion extending substantially perpendicularly from the ground plane and a second portion extending substantially parallel to the radiation element, and wherein the second portion is spaced apart from and not in contact with the radiation element.

2. The antenna according to claim 1, wherein the radiation element is coated with the electrically conductive ink by spray-painting.

3. The antenna according to claim 2, wherein the radiation element is made of polyethylene or polyurethane resin.

4. The antenna according to claim 1, wherein the radiation element is coated with the electrically conductive ink by brush-painting.

5. The antenna according to claim 4, wherein the radiation element is made of wood or NinjaFlex.

6. The antenna according to claim 1, wherein the feed is positioned within an area defined by an outer periphery of the ground plane in plan view.

7. The antenna according to claim 1, wherein the second portion of the L-shaped probe is spaced apart from the radiation element by 2 mm.

8. The antenna according to claim 1, wherein the ground plane has an area substantially larger than that of the radiation element.

9. The antenna according to claim 1, wherein the radiation element is positioned at a distance from an edge of the ground plane in plan view.

10. The antenna according to claim 1, where the radiation element is rectangular in shape.

11. The antenna according to claim 10, wherein the radiation element has a length of 55 mm and a width larger than or equal to 14 mm, and wherein the ground plane has a length and a width larger than or equal to 100 mm.

12. The antenna according to claim 1, wherein the dielectric member is in form of a substrate or one or more supporting structures.

13. The antenna according to claim 1, wherein the radiation element is spaced apart from the ground plane by 14 mm.

14. The antenna according to claim 1, wherein the antenna is a patch antenna.

15. The antenna according to claim 1, wherein the article is a planar artwork selected from a group of a painting, a drawing, a picture, a photograph, or a combination thereof.

16. An antenna-integrated article, comprising:

(i) the antenna according to claim 1, and (ii) an article comprising a surface for the antenna to be attached thereto.

17. The antenna-integrated article according to claim 16, wherein a radiation element of the antenna is attached on the surface of the article, with a ground plane positioned at a distance from the surface.

18. The antenna-integrated article according to claim 17, wherein the article further comprises a frame, wherein the frame is electrically insulative and is configured as a dielectric member to separate the radiation element from the ground plane.

19. The antenna-integrated article according to claim 16, wherein at least part of the surface of the article is configured with a decorative arrangement, such that upon the antenna being attached to the article, the antenna is camouflaged against the decorative arrangement on the surface of the article.

20. The antenna-integrated article according to claim 16, further comprising a data storage operably connected with the antenna; wherein the data storage stores information associated with the article that can be communicated via the antenna to an external device.

* * * * *